(12) United States Patent
Yamada et al.

(10) Patent No.: US 9,258,763 B2
(45) Date of Patent: *Feb. 9, 2016

(54) COMMUNICATION APPARATUS AND METHOD THAT CAN PROMPTLY AND EFFICIENTLY PERFORM DECODING/PROCESSING OF A DOWNLINK CONTROL INFORMATION THAT IS RELATED TO A SEARCH SPACE

(75) Inventors: Shohei Yamada, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/512,381

(22) PCT Filed: Nov. 25, 2010

(86) PCT No.: PCT/JP2010/071056
§ 371 (c)(1),
(2), (4) Date: Jul. 26, 2012

(87) PCT Pub. No.: WO2011/065442
PCT Pub. Date: Jun. 3, 2011

(65) Prior Publication Data
US 2012/0281576 A1    Nov. 8, 2012

(30) Foreign Application Priority Data
Nov. 30, 2009    (JP) .................................. 2009-271073

(51) Int. Cl.
*G01R 31/08* (2006.01)
*H04W 48/12* (2009.01)
(Continued)

(52) U.S. Cl.
CPC ............. *H04W 48/12* (2013.01); *H04L 1/0046* (2013.01); *H04L 1/0061* (2013.01); *H04L 5/001* (2013.01);
(Continued)

(58) Field of Classification Search
USPC .................. 370/216, 252, 329, 338; 375/260; 380/270; 455/434, 450, 509
See application file for complete search history.

(56) References Cited

U.S. PATENT DOCUMENTS 8,254,323 B2   8/2012   Chun et al.
8,289,911 B2   10/2012  Chun et al.
(Continued)

FOREIGN PATENT DOCUMENTS

GB    2 457 192 A      8/2009
GB    2457192 B        11/2010
WO    WO 2009/041779 A1  4/2009

OTHER PUBLICATIONS

3GPP TSG-RAN WG1 Meeting #58 Shenzhen, China, Aug. 24-28, 2009 R1-093465.*
(Continued)

*Primary Examiner* — Gregory Sefcheck
*Assistant Examiner* — Jael Ulysse
(74) *Attorney, Agent, or Firm* — Birch, Stewart, Kolasch & Birch, LLP

(57) ABSTRACT

A communication system, a mobile station apparatus, a base station apparatus, and a processing method are provided that can perform decoding processing of a PDCCH related to a search space efficiently, and can perform communication promptly. A mobile station apparatus for performing communication with a base station apparatus in a mobile communication system: perform monitoring of a physical downlink control channel in an extension search space in accordance with an instruction from the base station apparatus.

8 Claims, 14 Drawing Sheets

(51) Int. Cl.
*H04L 5/00* (2006.01)
*H04W 76/04* (2009.01)
*H04L 1/00* (2006.01)
*H04L 1/18* (2006.01)

(52) U.S. Cl.
CPC ............ *H04L 5/0007* (2013.01); *H04L 5/0053* (2013.01); *H04W 76/048* (2013.01); *H04L 1/0002* (2013.01); *H04L 1/1887* (2013.01)

(56) References Cited

U.S. PATENT DOCUMENTS

| | | | |
|---|---|---|---|
| 8,401,542 B2 | 3/2013 | Chung et al. | |
| 8,619,682 B2 | 12/2013 | Park et al. | |
| 8,739,013 B2 | 5/2014 | Chung et al. | |
| 8,797,904 B2 | 8/2014 | Chun et al. | |
| 2009/0088148 A1 | 4/2009 | Chung et al. | |
| 2009/0197630 A1* | 8/2009 | Ahn et al. | 455/522 |
| 2009/0238091 A1* | 9/2009 | Kim et al. | 370/252 |
| 2009/0323607 A1 | 12/2009 | Park et al. | |
| 2009/0323957 A1* | 12/2009 | Luo et al. | 380/270 |
| 2010/0118798 A1 | 5/2010 | Chun et al. | |
| 2010/0135159 A1 | 6/2010 | Chun et al. | |
| 2010/0190447 A1* | 7/2010 | Agrawal et al. | 455/63.1 |
| 2010/0215011 A1* | 8/2010 | Pan et al. | 370/329 |
| 2010/0227569 A1* | 9/2010 | Bala et al. | 455/73 |
| 2010/0279628 A1* | 11/2010 | Love et al. | 455/70 |
| 2010/0302983 A1* | 12/2010 | McBeath et al. | 370/311 |
| 2010/0323709 A1* | 12/2010 | Nam et al. | 455/450 |
| 2010/0331030 A1* | 12/2010 | Nory et al. | 455/509 |
| 2011/0038275 A1* | 2/2011 | Kim et al. | 370/252 |
| 2011/0070845 A1* | 3/2011 | Chen et al. | 455/91 |
| 2011/0083066 A1 | 4/2011 | Chung et al. | |
| 2011/0110441 A1* | 5/2011 | Chen et al. | 375/260 |
| 2011/0201333 A1* | 8/2011 | Kwon et al. | 455/434 |
| 2011/0243090 A1* | 10/2011 | Grovlen et al. | 370/329 |
| 2011/0299513 A1* | 12/2011 | Suzuki et al. | 370/338 |
| 2012/0008586 A1* | 1/2012 | Kwon et al. | 370/329 |
| 2012/0063350 A1* | 3/2012 | Kim et al. | 370/252 |
| 2012/0063351 A1* | 3/2012 | Kim et al. | 370/252 |
| 2012/0078933 A1* | 3/2012 | Kim et al. | 707/758 |
| 2013/0021935 A1 | 1/2013 | Chun et al. | |
| 2013/0051214 A1* | 2/2013 | Fong et al. | 370/216 |
| 2014/0003377 A1 | 1/2014 | Park et al. | |
| 2014/0301266 A1 | 10/2014 | Chun et al. | |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.10.0, Sep. 2009, pp. 1-147.

"DCI format and blind decoding for LTE-Advanced," 3GPP TSG-RAN WG1 Meeting #59 R1-094497, Panasonic, Nov. 9-13, 2009, pp. 1-5.

"PDCCH design and monitoring set for carrier aggregation," 3GPP TSG RAN WG1 Meeting #59 Tdoc R1-094990, Philips, Nov. 9-13, 2009.

"PDCCH designing issues for LTE-A," 3GPP TSG-RAN WG1 meeting #59 R1-094736, ZTE, Nov. 9-13, 2009, pp. 1-4.

International Search Report issued in PCT/JP2010/071056, mailed on Feb. 1, 2011.

Samsung, "PDCCH Extension to Support Operation with CI", 3GPP TSG RAN WG1 #59, Jeju, Korea, Nov. 9-13, 2009, R1-094569, 2 pages.

Motorola, "PDCCH Layer 1 Parameters for RRC Signaling", 3GPP TSG RAN1 #51bis, Sevilla, Spain, Jan. 14-18, 2008, 3 pages, R1-080077.

Nokia, Nokia Siemens Networks, "DL control signalling to support extended bandwidth", 3GPP TSG-RAN WG1 Meeting #56bis, Seoul, Korea, Mar. 23-27, 2009, 7 pages, R1-091362.

Qualcomm Europe, "Interpreting the Carrier Indicator Field", 3GPP TSG RAN WG1 #59; Nov. 9-13, 2009, Jeju, Korea, pp. 1-4, R1-095069.

* cited by examiner

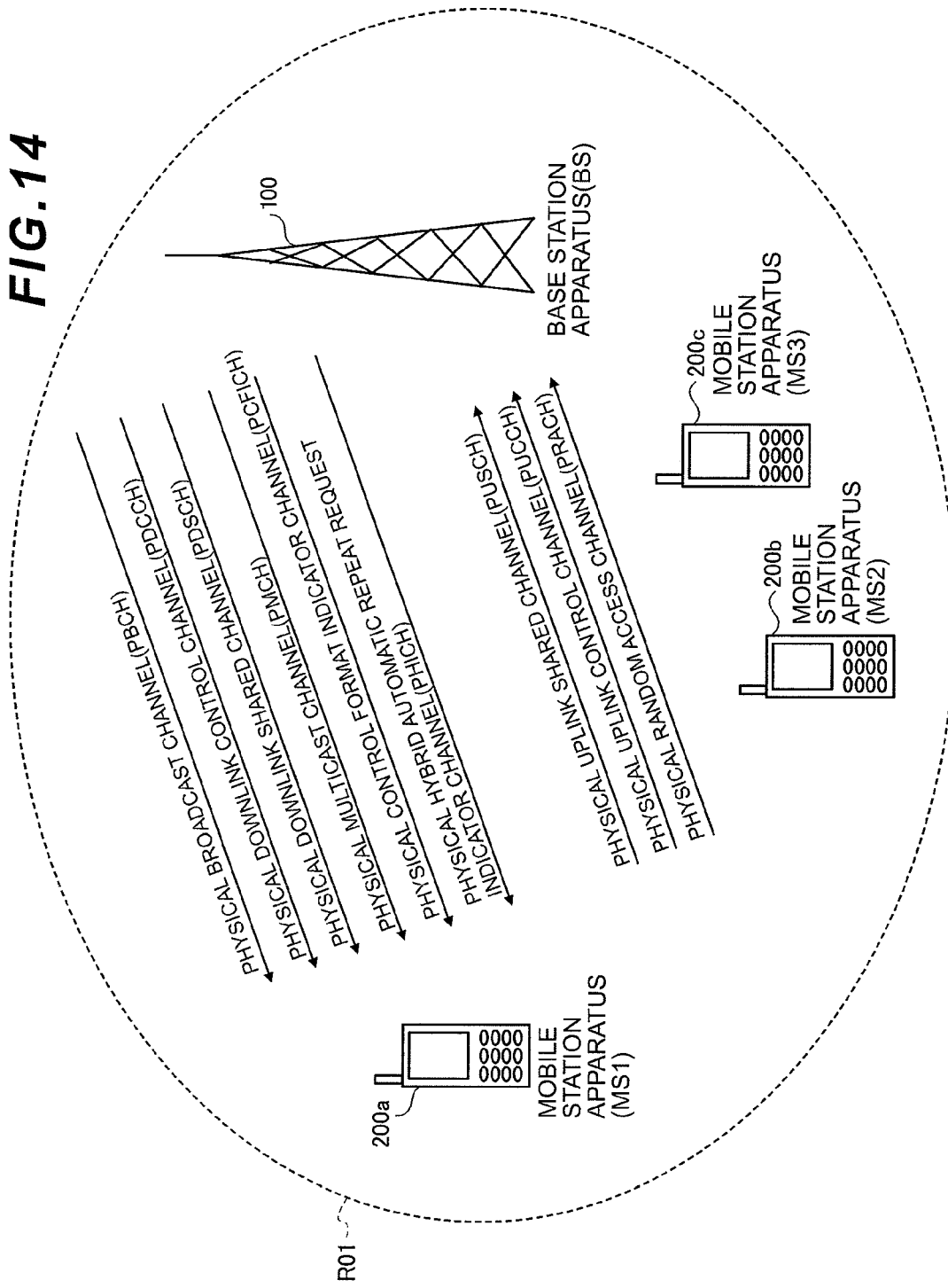

COMMUNICATION APPARATUS AND METHOD THAT CAN PROMPTLY AND EFFICIENTLY PERFORM DECODING/PROCESSING OF A DOWNLINK CONTROL INFORMATION THAT IS RELATED TO A SEARCH SPACE

TECHNICAL FIELD

The present invention relates to a mobile station apparatus, base station apparatus, and processing method; and more particular, to a communication system in which a search space of a physical downlink control channel is present, and a mobile station apparatus, base station apparatus, and processing method used in the communication system.

BACKGROUND ART

3GPP (3rd Generation Partnership Project) is a project to study/create specifications of a mobile telephone system based on a network in which W-CDMA (Wideband-Code Division Multiple Access) and GSM (Global System for Mobile Communications) are evolved.

In 3GPP, the W-CDMA system is standardized as the third-generation cellular mobile communication system and its services are launched sequentially. In addition, HSDPA (High-Speed Downlink Packet Access) in which the communication speed is further increased is also standardized, and its services are launched.

In 3GPP, the evolution of the third-generation radio access technology (referred to as LTE (Long Term Evolution) or EUTRA (Evolved Universal Terrestrial Radio Access)); and a mobile communication system (hereinafter, referred to as LTE-A (Long Term Evolution-Advanced) or Advanced-EUTRA) that utilizes a wider system bandwidth to thereby realize faster data transmission and reception are being studied.

As a downlink communication scheme in EUTRA, an OFDMA (Orthogonal Frequency Division Multiple Access) system performing user multiplexing by using subcarriers orthogonal to each other is proposed.

In addition, in the OFDMA system, there is applied a technology such as an adaptive modulation and coding scheme (AMCS) based on adaptive radio link control (Link Adaptation) such as channel coding.

The AMCS is a scheme for switching radio transmission parameters (also referred to as AMC modes), such as an error correction scheme, coding rate of error correction, and data modulation order, in accordance with the channel quality of each mobile station apparatus, in order to efficiently perform high-speed packet data transmission.

The channel quality of each mobile station apparatus is fed back to a base station apparatus by using a CQI (Channel Quality Indicator).

FIG. 14 is a view showing a channel configuration used in conventional communication systems. This channel configuration is used in a radio communication system such as EUTRA (see Non-patent document 1). The radio communication system shown in FIG. 14 includes a base station apparatus 100 and mobile station apparatuses 200a, 200b, and 200c. R01 denotes a range in which the base station apparatus 100 is communicable, and the base station apparatus 1000 communicates with a mobile station apparatus existing in this range R01.

In EUTRA, a physical broadcast channel (PBCH), a physical downlink control channel (PDCCH), a physical downlink shared channel (PDSCH), a physical multicast channel (PMCH), a physical control format indicator channel (PC-FICH), and a physical hybrid ARQ indicator channel (PHICH) are used in a downlink on which signals are transmitted from the base station apparatus 100 to the mobile station apparatuses 200a to 200c.

Furthermore, in EUTRA, a physical uplink shared channel (PUSCH), a physical uplink control channel (PUCCH), and a physical random access channel (PRACH) are used in an uplink on which signals are transmitted from the mobile station apparatuses 200a to 200c to the base station apparatus 100.

Downlink control information carried by the physical downlink control channel (PDCCH) is referred to as DCI (Downlink Control Information). A plurality of formats is prepared for DCI. The format of DCI is referred to as a DCI Format (downlink control information format). A plurality of DCI Formats is present, and DCI Formats are classified by uses, the number of bits, or the like. There are DCI Formats having the same number of bits or the different number of bits. The mobile station apparatus performs reception of the physical downlink shared channel (PDSCH) in accordance with a received DCI Format. The mobile station apparatus can determine the use application of the PDCCH and/or the PDSCH and/or the PUSCH (transport channel or logical channel), the DCI format, a transmission scheme of the PDSCH, or a transmission scheme of the PUSCH due to by what identifier (RNTI) the cyclic redundancy check (CRC) of DCI is scrambled. An RNTI (Radio Network Temporary Identity) is implicitly coded by the CRC of DCI included in the physical downlink control channel (PDCCH). Specifically, by computing the logical sum of CRC parity bits of 16 bits and an RNTI of 16 bits, a CRC is scrambled by the RNTI.

Specific description of downlink-related PDCCH decoding processing will be given. A mobile station apparatus set so as to decode a PDCCH having a CRC scrambled by an SI-RNTI, a P-RNTI or an RA-RNTI decodes DCI Format 1A or DCI Format 1C in the common search space. A mobile station apparatus set so as to decode a PDCCH having a CRC scrambled by a C-RNTI, or an SPS C-RNTI decodes: DCI Format 1A in the common search space; or DCI Format 1A or DCI Formats (1, 1B, 1D, 2, and 2A) in the mobile station-specific search space. A mobile station apparatus set so as to decode a PDCCH having a CRC scrambled by a Temporary C-RNTI decodes: DCI Format 1A in the common search space; or DCI Format 1A or DCI Format 1 in the mobile station-specific search space.

Specific description of uplink-related PDCCH decoding processing will be given. A mobile station apparatus set so as to decode a PDCCH having a CRC scrambled by a C-RNTI, or an SPS C-RNTI decodes: DCI Format 0 in the common search space; or DCI Format 0 in the mobile station-specific search space. A mobile station apparatus set so as to decode a PDCCH having a CRC scrambled by a C-RNTI, and set so as to receive a PDCCH Ordered RACH for downlink data arrival decodes: DCI Format 1A in the common search space; or DCI Format 1A in the mobile station-specific search space. A mobile station apparatus set so as to decode a PDCCH having a CRC scrambled by a Temporary C-RNTI decodes DCI Format 0 in the common search space. A mobile station apparatus set so as to decode a PDCCH having a CRC scrambled by a TPC-PUCCH-RNTI, or a TPC-PUSCH-RNTI decodes DCI Formats (3A and 3) in the common search space. DCI Format 3A and DCI Format 3 can arrange TPC Commands of a plurality of mobile station apparatuses in a DCI field. Therefore, DCI Format 3A and DCI Format 3 are arranged in the common search space so that the plurality of mobile station apparatuses can perform monitoring.

Basic systems of EUTRA are followed in LTE-A. Furthermore, frequency bands used in ordinary systems are continuous in LTE-A, whereas it is proposed that a plurality of continuous/discontinuous frequency bands (hereinafter, referred to as carrier components or component carriers) is compositely used and thus they are operated as one wide frequency band (wide system band) (spectrum aggregation, or carrier aggregation). That is, one system band is configured by a plurality of component carriers each having bandwidths of a part of a system band that is available frequency bands. Mobile station apparatuses for LTE or LTE-A can operate in respective component carriers. In addition, it is proposed that, in order to more flexibly use a frequency band assigned to a mobile communication system, a frequency band used in downlink communication and a frequency band used in uplink communication have different frequency bandwidths.

RELATED ART DOCUMENTS

Non-Patent Documents

Non-patent document 1: 3GPP TS (Technical Specification) 36.300, V8.10.0 (2009-09), Technical Specification Group Radio Access Network, Evolved Universal Terrestrial Radio Access (E-UTRA) and Evolved Universal Terrestrial Radio Access Network (E-UTRAN); Overall description; Stage 2 (Release 8)

SUMMARY OF THE INVENTION

Problems to be Solved by the Invention

However, there has been a problem in which it is impossible to efficiently perform: broadcasting to a plurality of mobile station apparatuses, of scheduling of system information of respective component carriers, and the like; and uplink electric-power control for a group of mobile station apparatuses, of a TPC-PUCCH-RNTI, a TPC-PUSCH-RNTI, or the like, for PDCCH decoding processing when communication is performed by the plurality of component carriers in mobile communication systems conventionally known. This is because there are a very few PDCCH candidates in the common search space, and the common search space is not designed so that many PDCCHs are arranged in the common search space.

When a component carrier is reduced in which a certain mobile station apparatus monitors a PDCCH with respect to scheduling of system information, random access response, and paging information, it is necessary to arrange a PDCCH for scheduling of system information of another component carrier in a certain component carrier. In that case, it is necessary to arrange a plurality of PDCCHs in the common search space, and the overflow of the common search space is caused.

In order to perform electric-power control on a plurality of component carriers with respect to uplink electric-power control, it is necessary that one mobile station apparatus monitors a plurality of TPC-PUCCH-RNTIs, or TPC-PUSCH-RNTIs that belong to a plurality of groups. In that case, it is necessary to arrange a plurality of PDCCHs in the common search space, and the overflow of the common search space is caused.

These problems with respect to a search space exert an effect also on decoding processing of a PDCCH in the case of performing communication by one component carrier.

The present invention has been made in view of the above-described circumstances, and an objective of the present invention is to: perform decoding processing of a PDCCH related to a search space efficiently; and provide a mobile station apparatus, a base station apparatus, and a processing method that can perform communication promptly.

Means of Solving the Problems

According to a first aspect of the present invention, there is provided a mobile station apparatus for performing communication with a base station apparatus in a mobile communication system. The mobile station apparatus: performs monitoring of a physical downlink control channel in a common search space commonly determined for the mobile station apparatuses in a cell, and a mobile station-specific search space determined for each mobile station apparatus in the cell search; and performs monitoring of the physical downlink control channel also in an extension search space in accordance with an instruction from the base station apparatus.

According to a second aspect of the present invention, there is provided a base station apparatus for performing communication with a mobile station apparatus in a mobile communication system. The base station apparatus instructs the mobile station that performs monitoring of a physical downlink control channel in a common search space commonly determined for mobile station apparatuses in a cell, and a mobile station-specific search space determined for each mobile station apparatus in the cell, to perform monitoring of the physical downlink control channel also in an extension search space.

According to a third aspect of the present invention, there is provided a method for processing a mobile station apparatus in a mobile communication system, wherein the mobile station apparatus: performs monitoring of a physical downlink control channel in a common search space commonly determined for mobile station apparatuses in a cell, and a mobile station-specific search space determined for each mobile station apparatus in the cell; and performs monitoring of the physical downlink control channel also in an extension search space in accordance with an instruction from the base station apparatus.

According to a fourth aspect of the present invention, there is provided a method for processing a base station apparatus in a mobile communication system, wherein the base station apparatus instructs the mobile station that performs monitoring of a physical downlink control channel in a common search space commonly determined for mobile station apparatuses in a cell, and a mobile station-specific search space determined for each mobile station apparatus in the cell, to perform monitoring of the physical downlink control channel also in an extension search space.

According to a fifth aspect of the present invention, there is provided a mobile station apparatus for performing communication with a base station apparatus in a mobile communication system. The mobile station apparatus: performs monitoring of a physical downlink control channel in a common search space commonly determined for mobile station apparatuses in a cell, and a mobile station-specific search space determined for each mobile station apparatus in the cell, in one or more component carriers set as a PDCCH monitoring set; and performs monitoring of the physical downlink control channel in a common search space in a component carrier that is not set as the PDCCH monitoring set.

According to a sixth aspect of the present invention, there is provided a method for processing a mobile station apparatus in a mobile communication system. The method includes the steps of: performing monitoring of a physical downlink control channel in a common search space commonly determined for mobile station apparatuses in a cell, and a mobile station-specific search space determined for each mobile station apparatus in the cell, in one or more component carriers set as a PDCCH monitoring set; and performing monitoring of the physical downlink control channel in a common search space in a component carrier that is not set as the PDCCH monitoring set.

Advantages of the Invention

A communication system, a mobile station apparatus, a base station apparatus, and a processing method of the present invention can efficiently perform decoding processing of a PDCCH related to a search space, and can promptly perform communication.

BRIEF DESCRIPTION OF THE DRAWINGS

FIG. 14 is a view showing a configuration of channels used in conventional communication systems.

BEST MODES FOR CARRYING OUT THE INVENTION

Hereinafter, embodiments of the present invention will be described with reference to the drawings. A mobile communication system according to an embodiment of the present invention includes one or more base station apparatuses (base stations) and one or more mobile station apparatuses (mobile stations), and performs the radio communication therebetween. One base station apparatus configures one or more cells, and can accommodate one or more mobile station apparatuses in one cell.

Figure 1:
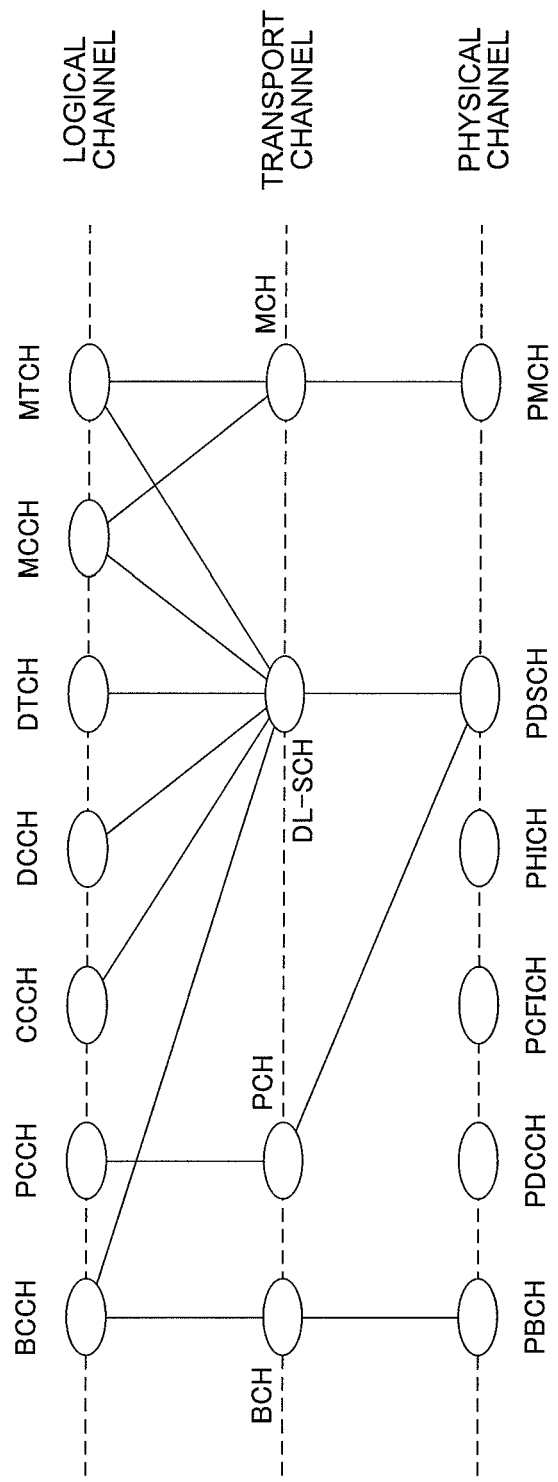
FIG. 1 is a view showing a configuration of downlink channels used in a communication system according to an embodiment of the present invention.
Figure 2:
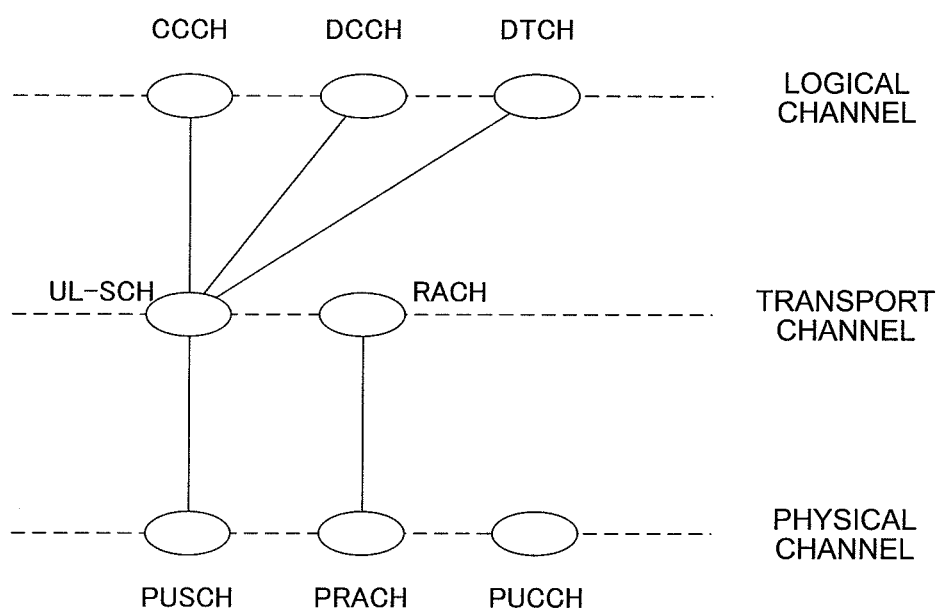
FIG. 2 is a view showing a configuration of uplink channels used in a communication system according to an embodiment of the present invention.

FIG. 1 is a view showing a configuration of downlink channels used in a communication system according to an embodiment of the present invention. In addition, FIG. 2 is a view showing a configuration of downlink channels used in a communication system according to an embodiment of the present invention. The downlink channels shown in FIG. 1 and the uplink channels shown in FIG. 2 both include logical channels, transport channels, and physical channels.

The logical channel defines the kind of data transmission service to be transmitted/received in a medium access control (MAC) layer. The transport channel defines what kind of properties data to be transmitted by a radio interface has and how the data is transmitted. The physical channel is a physical channel carrying the transport channel.

The logical channels of the downlink include a broadcast control channel (BCCH), a paging control channel (PCCH), a common control channel (CCCH), a dedicated control channel (DCCH), a dedicated traffic channel (DTCH), a multicast control channel (MCCH), and a multicast traffic channel (MTCH). The logical channels of the uplink includes a common control channel (CCCH), a dedicated control channel (DCCH), and a dedicated traffic channel (DTCH).

The transport channels of the downlink include a broadcast channel (BCH), a paging channel (PCH), a downlink shared channel (DL-SCH), and a multicast channel (MCH). The transport channels of the uplink include an uplink shared channel (UL-SCH) and a random access channel (RACH).

The physical channels of the downlink include a physical broadcast channel (PBCH), a physical downlink control channel (PDCCH), a physical downlink shared channel (PDSCH), a physical multicast channel (PMCH), a physical control format indicator channel (PCFICH), and a physical hybrid ARQ indicator channel (PHICH). The physical channels of the uplink include a physical uplink shared channel (PUSCH), a physical random access channel (PRACH), and a physical uplink control channel (PUCCH).

These channels are transmitted and received between the base station apparatus and the mobile station apparatus as shown in FIG. 14 described in the conventional art.

Next, the logical channels will be described. The broadcast control channel (BCCH) is a downlink channel used to broadcast system information. The paging control channel (PCCH) is a downlink channel used to transmit paging information, and is used when the network does not know a cell position of a mobile station apparatus.

The common control channel (CCCH) is a channel used to transmit control information between a mobile station apparatus and the network, and is used by the mobile station apparatus that does not have a radio resource control (RRC) connection with the network.

The dedicated control channel (DCCH) is a point-to-point bidirectional channel, and is a channel utilized to transmit individual control information between a mobile station apparatus and the network. The dedicated control channel (DCCH) is used by a mobile station apparatus having an RRC connection.

The dedicated traffic channel (DTCH) is a point-to-point bidirectional channel, is a channel dedicated to one mobile station apparatus, and is utilized for transfer of user information (unicast data).

The multicast control channel (MCCH) is a downlink channel used for point-to-multipoint transmission of MBMS (Multimedia Broadcast Multicast Service) control information from the network to a mobile station apparatus. This is used for an MBMS service providing a point-to-multipoint service.

As methods for transmitting an MBMS service, there are single-cell point-to-multipoint (SCPTM) transmission and multimedia broadcast multicast service single frequency network (MBSFN) transmission. The MBSFN transmission is a simultaneous transmission technique realized by simultaneously transmitting identifiable waveforms (signals) from a plurality of cells. In contrast, the SCPTM transmission is a method for transmitting an MBMS service by one base station apparatus.

The multicast control channel (MCCH) is utilized in one or a plurality of multicast traffic channels (MTCHs). The multicast traffic channel (MTCH) is a downlink channel used for point-to-multipoint transmission of traffic data (MBMS transmission data) from the network to a mobile station apparatus.

Meanwhile, the multicast control channel (MCCH) and the multicast traffic channel (MTCH) are utilized only by a mobile station apparatus receiving an MBMS.

System information managed by RRC is broadcast on the broadcast control channel (BCCH), or individual mobile station apparatuses are notified of the system information, from a base station apparatus by the RRC signaling of the common control channel (CCCH) and/or the dedicated control channel (DCCH).

Next, the transport channels will be described. The broadcast channel (BCH) is broadcast to the entire cell by a fixed and predefined transmission format. The downlink shared channel (DL-SCH) supports HARQ (Hybrid Automatic Repeat Request), dynamic adaptive radio link control, DRX (Discontinuous Reception), and MBMS transmission, and needs to be broadcast to the entire cell.

Furthermore, the downlink shared channel (DL-SCH) enables beam forming to be used, and supports dynamic resource allocation and semi-static resource allocation. The paging channel (PCH) supports DRX and needs to be broadcast to the entire cell.

In addition, the paging channel (PCH) is mapped to physical resources dynamically used for the traffic channel and other control channels, i.e., the physical downlink shared channel (PDSCH).

The multicast channel (MCH) needs to be broadcast to the entire cell. Moreover, the multicast channel (MCH) supports semi-static resource allocation of: MBSFN (MBMS Single Frequency Network) combining of MBMS transmission from a plurality of cells; a time frame using an extended cyclic prefix (CP); and the like.

The uplink shared channel (UL-SCH) supports HARQ and dynamic adaptive radio link control. In addition, the uplink shared channel (UL-SCH) enables beam forming to be utilized. Dynamic resource allocation and semi-static resource allocation are supported. The random access channel (RACH) is used to transmit limited control information, and has the risk of collisions.

Next, the physical channels will be described. The broadcast channel (BCH) is mapped to the physical broadcast channel (PBCH) at 40 ms intervals. The 40 ms timing is blindly detected (blind detection). That is, for timing presentation, explicit signaling may not be performed. In addition, a subframe including the physical broadcast channel (PBCH) can be decoded only by the subframe (is self-decodable).

The physical downlink control channel (PDCCH) is a channel used to notify a mobile station apparatus of the resource allocation of the downlink shared channel (PDSCH), hybrid automatic repeat request (HARQ) information for downlink data, and uplink transmission permission (uplink grant) that is the resource allocation of the physical uplink shared channel (PUSCH).

The physical downlink shared channel (PDSCH) is a channel used to transmit downlink data or paging information. The physical multicast channel (PMCH) is a channel used to transmit the multicast channel (MCH), and a downlink reference signal, an uplink reference signal and a physical downlink synchronization signal are separately arranged.

The physical uplink shared channel (PUSCH) is a channel used to mainly transmit uplink data (UL-SCH). When a base station apparatus 100 performs scheduling on a mobile station apparatus 200, a channel feedback report (a downlink channel quality indicator (CQI), a precoding matrix indicator (PMI), and a rank indicator (RI)), and an HARQ acknowledgement (ACK)/negative acknowledgement (NACK) in response to downlink transmission are also transmitted by using the physical uplink shared channel (PUSCH).

The physical random access channel (PRACH) is a channel used to transmit a random access preamble, and has a guard time. The physical uplink control channel (PUCCH) is a channel used to transmit the channel feedback report (CQI, PMI, and RI), a scheduling request (SR), the HARQ acknowledge/negative acknowledgement in response to downlink transmission, and the like.

The physical control format indicator channel (PCFICH) is a channel utilized to notify a mobile station apparatus of the number of OFDM symbols used for the physical downlink control channel (PDCCH), and transmitted in each subframe.

The physical hybrid ARQ indicator channel (PHICH) is a channel utilized to transmit an HARQ ACK/NACK in response to uplink transmission.

The downlink reference signal (DL-RS) is a pilot signal transmitted at a predetermined electric power for each cell. In addition, the downlink reference signals are signals periodically repeated at a predetermined time interval (for example, one frame); and a mobile station apparatus receives downlink reference signals at the predetermined time interval and measures reception quality, and thus it is used for determination of reception quality for each cell. In addition, the downlink reference signal is used as a reference signal for demodulation of downlink data transmitted concurrently with the downlink reference signal. If a sequence used for the downlink reference signal is uniquely identifiable for each cell, any sequence may be used.

Next, channel mapping by a communication system according to a first embodiment of the present invention will be described.

As shown in FIG. 1, in the downlink, the mapping of the transport channels and the physical channels is performed as follows. The broadcast channel (BCH) is mapped to the physical broadcast channel (PBCH).

The multicast channel (MCH) is mapped to the physical multicast channel (PMCH). The paging channel (PCH) and the downlink shared channel (DL-SCH) are mapped to the physical downlink shared channel (PDSCH).

The physical downlink control channel (PDCCH), the physical hybrid ARQ indicator channel (PHICH) and the physical control format indicator channel (PCHICH) are used independently in the physical channels.

In contrast, in the uplink, the mapping of the transport channels and the physical channels is performed as follows. The uplink shared channel (UL-SCH) is mapped to the physical uplink shared channel (PUSCH).

The random access channel (RACH) is mapped to the physical random access channel (PRACH). The physical uplink control channel (PUCCH) is used independently in the physical channels.

In addition, in the downlink, the mapping of the logical channels and the transport channels is performed as follows. The paging control channel (PCCH) is mapped to the paging channel (PCH).

The broadcast control channel (BCCH) is mapped to the broadcast channel (BCH) and the downlink shared channel (DL-SCH). The common control channel (CCCH), the dedicated control channel (DCCH) and the dedicated traffic channel (DTCH) are mapped to the downlink shared channel (DL-SCH).

The multicast control channel (MCCH) is mapped to the downlink shared channel (DL-SCH) and the multicast channel (MCH). The multicast traffic channel (MTCH) is mapped to the downlink shared channel (DL-SCH) and the multicast channel (MCH).

Meanwhile, the mapping from the multicast control channel (MCCH) and the multicast traffic channel (MTCH) to the multicast channel (MCH) is performed at the time of MBSFN transmission, while this mapping is performed to the downlink shared channel (DL-SCH) at the time of SCPTM transmission.

In contrast, in the uplink, the mapping of the logical channels and the transport channels is performed as follows. The common control channel (CCCH), the dedicated control channel (DCCH) and the dedicated traffic channel (DTCH) are mapped to the uplink shared channel (UL-SCH). The logical channels are not mapped to the random access channel (RACH).

Figure 3:
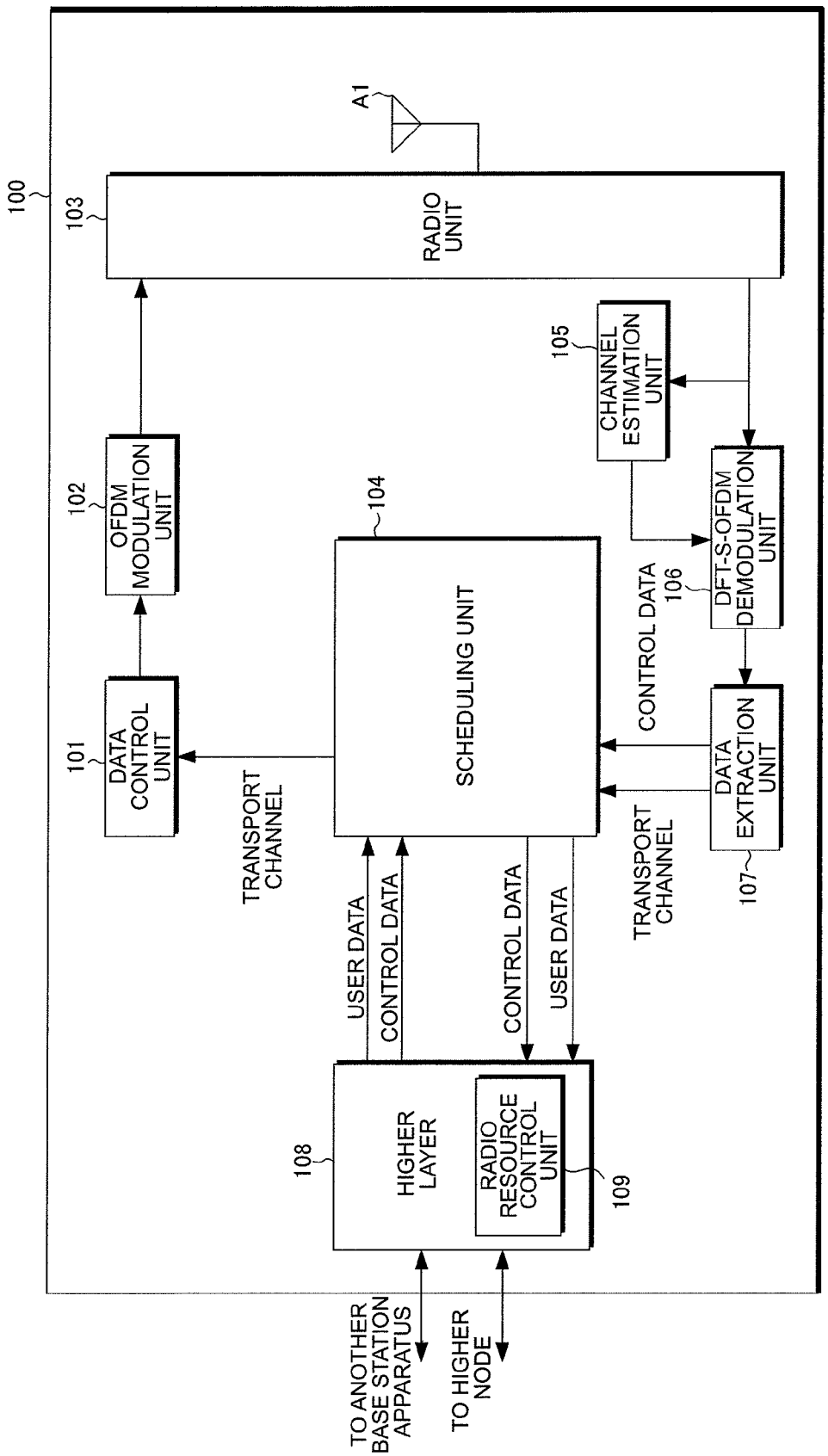
FIG. 3 is a schematic block diagram showing a configuration of a base station apparatus according to an embodiment of the present invention.

FIG. 3 is a schematic block diagram showing a configuration of the base station apparatus 100 according to the first embodiment of the present invention. The base station apparatus 100 includes a data control unit 101, an OFDM modulation unit 102, a radio unit 103, a scheduling unit 104, a channel estimation unit 105, a DFT-S-OFDM (DFT-Spread-OFDM) demodulation unit 106, a data extraction unit 107, an higher layer 108, and an antenna unit A1.

The radio unit 103, the scheduling unit 104, the channel estimation unit 105, the DFT-S-OFDM demodulation unit 106, the data extraction unit 107, the higher layer 108, and the antenna unit A1 constitute a reception unit. In addition, the data control unit 101, the OFDM modulation unit 102, the radio unit 103, the scheduling unit 104, the higher layer 108, and the antenna unit A1 constitute a transmission unit. A part of respective transmission units and reception units is configured so as to separately perform processing for each component carrier, and a part of respective transmission units and reception units is configured so as to perform a common processing among component carriers.

The antenna unit A1, the radio unit 103, the channel estimation unit 105, the DFT-S-OFDM demodulation unit 106, and the data extraction unit 107 perform processing of the physical layer of the uplink. The antenna unit A1, the data control unit 101, the OFDM modulation unit 102, and the radio unit 103 perform processing of the physical layer of the downlink.

The data control unit 101 obtains a transport channel from the scheduling unit 104. The data control unit 101 maps the transport channel, and a signal and channel generated in the physical layer based on scheduling information input from the scheduling unit 104, to a physical channel based on the scheduling information input from the scheduling unit 104. Data mapped as described above is output to the OFDM modulation unit 102.

The OFDM modulation unit 102 performs OFDM signal processing such as coding, data modulation, serial/parallel conversion of an input signal, IFFT (Inverse Fast Fourier Transform) processing, CP insertion, filtering, and the like, for data input from the data control unit 101, based on the scheduling information (including downlink physical resource block (PRB) allocation information (for example, physical resource block position information such as frequency and time), a modulation scheme and coding scheme (for example, 16QAM modulation and a ⅔ coding rate) corresponding to each downlink physical resource block (PRB), and the like) input from the scheduling unit 104, generates an OFDM signal, and outputs the OFDM signal to the radio unit 103.

The radio unit 103 generates a radio signal by up-converting modulation data input from the OFDM modulation unit 102 into a radio frequency, and transmits the radio signal to the mobile station apparatus 200 via the antenna unit A1. In addition, the radio unit 103 receives an uplink radio signal from the mobile station apparatus 200 via the antenna unit A1, down-converts the uplink radio signal into a baseband signal, and outputs reception data to the channel estimation unit 105 and the DFT-S-OFDM demodulation unit 106.

The scheduling unit 104 performs processing of the medium access control (MAC) layer. The scheduling unit 104 performs mapping of a logical channel and a transport channel, downlink and uplink scheduling (HARQ processing, transport format selection, and the like), and the like. Since the scheduling unit 104 controls the processing units of respective physical layers integrally, interfaces between: the scheduling unit 104; and the antenna unit A1, the radio unit 103, the channel estimation unit 105, the DFT-S-OFDM demodulation unit 106, the data control unit 101, the OFDM modulation unit 102, and the data extraction unit 107 are present. However, the interfaces are not shown.

In downlink scheduling, the scheduling unit 104 generates scheduling information used in: processing of selecting a downlink transport format (transmission format) (physical resource block (PRB) allocation, a modulation scheme, a coding scheme, and the like) for modulating data; retransmission control in HARQ; and the downlink scheduling, based on: feedback information (a downlink channel feedback report (channel quality (CQI), the number of streams (RI), precoding information (PMI), and the like)), ACK/NACK feedback information for downlink data, and the like) received from the mobile station apparatus 200; available downlink physical resource block (PRB) information of each mobile station apparatus; a buffer situation; scheduling information input from the higher layer 108; and the like. The scheduling information used in the downlink scheduling is output to the data control unit 101 and the data extraction unit 107.

In addition, in uplink scheduling, the scheduling unit 104 generates scheduling information used in: processing of selecting an uplink transport format (transmission format) (physical resource block (PRB) allocation, a modulation scheme, a coding scheme, and the like) for modulating data; and the uplink scheduling, based on: an estimation result of an uplink channel state (radio channel state) output by the channel estimation unit 105; a resource allocation request from the mobile station apparatus 200; available downlink physical resource block (PRB) information of each mobile station apparatus 200; scheduling information input from the higher layer 108; and the like. The scheduling information used in the uplink scheduling is output to the data control unit 101 and the data extraction unit 107.

In addition, the scheduling unit 104 notifies the data control unit 101 of the downlink and uplink scheduling information including information for coding of a physical downlink control channel (PDCCH). At this time, in order to scramble, by a suitable RNTI (Radio Network Temporary Identity), the cyclic redundancy check (CRC) of downlink control information (DCI) carried by the physical downlink control channel (PDCCH) in the data control unit 101, the scheduling unit 104 notifies the data control unit 101 of the downlink and uplink scheduling information including suitable RNTI information.

In addition, the scheduling unit 104 maps a logical channel of the downlink input from the higher layer 108 to a transport channel, and outputs the resultant to the data control unit 101. In addition, after the scheduling unit 104, if necessary, processes control data and a transport channel obtained in the uplink input from the data extraction unit 107, the scheduling unit 104 maps the resultant to a logical channel of the uplink, and outputs the resultant to the higher layer 108.

The channel estimation unit 105 estimates an uplink channel state from an uplink demodulation reference signal (DRS) for uplink data demodulation, and outputs the estimation result to the DFT-S-OFDM demodulation unit 106. In addition, in order to perform the uplink scheduling, an uplink channel state is estimated from an uplink sounding reference signal (SRS), and the estimation result is output to the scheduling unit 104.

Meanwhile, although an uplink communication scheme is assumed to be a single carrier scheme such as DFT-S-OFDM or the like, a multi-carrier scheme such as an OFDM scheme may be used.

Based on the uplink channel state estimation result input from the channel estimation unit 105, the DFT-S-OFDM demodulation unit 106 performs demodulation processing by performing DFT-S-OFDM signal processing such as DFT (Discrete Fourier Transform) conversion, subcarrier mapping, IFFT conversion, filtering, and the like, on modulation data input from the radio unit 103, and outputs the resultant to the data extraction unit 107.

Based on the scheduling information from the scheduling unit 104, the data extraction unit 107 checks the accuracy of data input from the DFT-S-OFDM demodulation unit 106, and in addition, outputs the check result (acknowledgment signal ACK/negative acknowledgement signal NACK) to the scheduling unit 104.

Furthermore, based on the scheduling information from the scheduling unit 104, the data extraction unit 107 separates a transport channel and control data of the physical layer from the data input from the DFT-S-OFDM demodulation unit 106, and outputs the resultant to the scheduling unit 104.

The separated control data includes feedback information (a downlink channel feedback report (CQI, PMI, and RI) and ACK/NACK feedback information for downlink data) of which the scheduling unit 104 is notified from the mobile station apparatus 200, and the like.

The higher layer 108 performs processing of a packet data convergence protocol (PDCP) layer, a radio link control (RLC) layer, and a radio resource control (RRC) layer. Since the higher layer 108 controls processing units of the lower layers integrally, interfaces between: the higher layer 108; and the scheduling unit 104, the antenna unit A1, the radio unit 103, the channel estimation unit 105, the DFT-S-OFDM demodulation unit 106, the data control unit 101, the OFDM modulation unit 102, and the data extraction unit 107 are present. However, the interfaces are not shown.

The higher layer 108 has a radio resource control unit 109. In addition, the radio resource control unit 109 performs management of various types of setting information, management of system information, management of measurement setting and measurement result, paging control, management of a communication state of each mobile station apparatus, mobility management of a handover and the like, management of a buffer situation for each mobile station apparatus, management of connection setting of unicast and multicast bearers, management of a mobile station identifier (UEID), and the like. The higher layer 108 performs transmission/reception of information to/from another base station apparatus and to/from an upper node.

Figure 4:
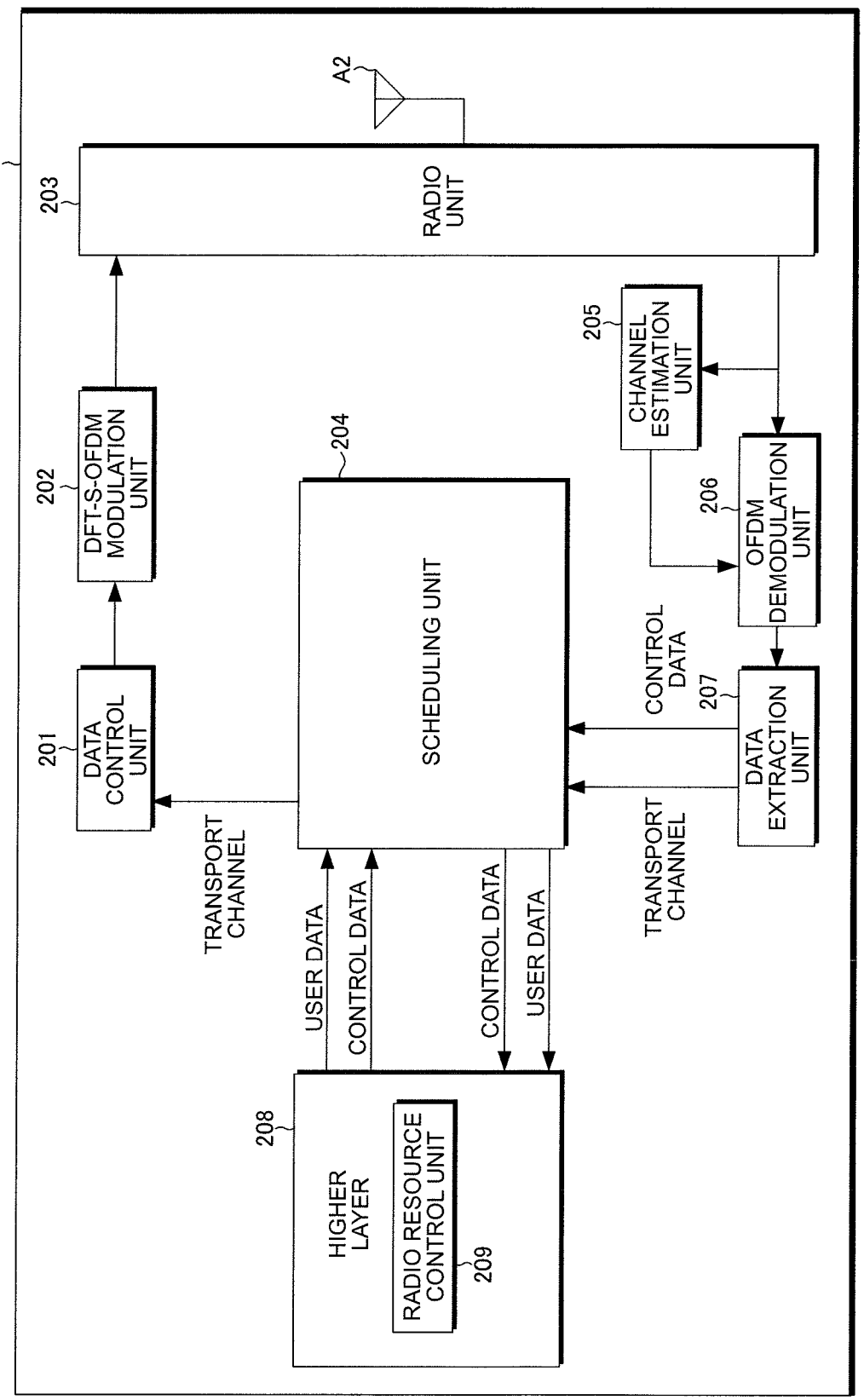
FIG. 4 is a schematic block diagram showing a configuration of a mobile station apparatus according to an embodiment of the present invention.

FIG. 4 is a schematic block diagram showing a configuration of the mobile station apparatus 200 according to the first embodiment of the present invention. The mobile station apparatus 200 includes a data control unit 201, a DFT-S-OFDM modulation unit 202, a radio unit 203, a scheduling unit 204, a channel estimation unit 205, an OFDM demodulation unit 206, a data extraction unit 207, an higher layer 208, and an antenna unit A2.

The data control unit 201, the DFT-S-OFDM modulation unit 202, the radio unit 203, the scheduling unit 204, the higher layer 208, and the antenna unit A2 constitute a transmission unit. The radio unit 203, the scheduling unit 204, the channel estimation unit 205, the OFDM demodulation unit 206, the data extraction unit 207, the higher layer 208, and the antenna unit A2 constitute a reception unit. In addition, the scheduling unit 204 constitutes a selection unit.

The antenna unit A2, the data control unit 201, the DFT-S-OFDM modulation unit 202, and the radio unit 203 perform processing of the physical layer of the uplink. The antenna unit A2, the radio unit 203, the channel estimation unit 205, the OFDM demodulation unit 206, and the data extraction unit 207 perform processing of the physical layer of the downlink. A part of respective transmission units and reception units is configured so as to separately perform processing for each component carrier, and a part of respective transmission units and reception units is configured so as to perform a common processing among component carriers.

The data control unit 201 obtains a transport channel from the scheduling unit 204. The data control unit 201 maps the transport channel and a signal and channel generated in the physical layer based on scheduling information input from the scheduling unit 204, to a physical channel based on the scheduling information input from the scheduling unit 204. Data thus mapped is output to the DFT-S-OFDM modulation unit 202.

The DFT-S-OFDM modulation unit 202 performs, on the data input from data control unit 201, DFT-S-OFDM signal processing such as data modulation, DFT processing, subcarrier mapping, inverse fast Fourier transform (IFFT) processing, cyclic prefix (CP) insertion, filtering, and the like, generates a DFT-S-OFDM signal, and outputs the DFT-S-OFDM signal to the radio unit 203.

Meanwhile, although an uplink communication scheme is assumed to be a single carrier scheme such as DFT-S-OFDM or the like, a multi-carrier scheme such as an OFDM scheme may be used instead.

The radio unit 203 generates a radio signal by up-converting modulation data input from the DFT-S-OFDM modulation unit 202 into a radio frequency, and transmits the radio signal to the base station apparatus 100 via the antenna unit A2.

In addition, the radio unit 203 receives a radio signal modulated by downlink data from the base station apparatus 100 via the antenna unit A2, down-converts the radio signal into a baseband signal, and outputs reception data to the channel estimation unit 205 and the OFDM demodulation unit 206.

The scheduling unit 204 performs processing of the medium access control (MAC) layer. The scheduling unit 204 performs mapping of a logical channel and a transport channel, downlink and uplink scheduling (HARQ processing, transport format selection, and the like), and the like.

Since the scheduling unit 204 controls processing units of the physical layers integrally, interfaces between: the scheduling unit 204; and the antenna unit A2, the data control unit 201, the DFT-S-OFDM modulation unit 202, the channel estimation unit 205, the OFDM demodulation unit 206, the data extraction unit 207, and the radio unit 203 are present. However, the interfaces are not shown.

In downlink scheduling, the scheduling unit 204 generates scheduling information used in: reception control of the transport channel, a physical signal, and a physical channel; HARQ retransmission control; and the downlink scheduling, based on scheduling information (transport format and HARQ retransmission information) and the like from the base station apparatus 100 and the higher layer 208. The scheduling information used in the downlink scheduling is output to the data control unit 201 and the data extraction unit 207.

In uplink scheduling, the scheduling unit 204 generates scheduling information used in: scheduling processing for mapping a logical channel of the uplink input from the higher layer 208 to a transport channel; and the uplink scheduling, based on: a buffer situation of the uplink input from the higher layer 208; uplink scheduling information from the base station apparatus 100 input from the data extraction unit 207 (transport format, HARQ retransmission information, and the like); scheduling information input from the higher layer 208; and the like. Meanwhile, as to the uplink transport format, information of which the scheduling unit 204 is notified from the base station apparatus 100 is utilized. This scheduling information is output to the data control unit 201 and the data extraction unit 207.

Furthermore, the scheduling unit 204 maps the logical channel of the uplink input from the higher layer 208 to the transport channel, and outputs the resultant to the data control unit 201. In addition, the scheduling unit 204 outputs also a downlink channel feedback report (CQI, PMI, and RI) input from the channel estimation unit 205 and also a CRC check result input from the data extraction unit 207, to the data control unit 201.

In addition, after the scheduling unit 204, if necessary, processes control data and a transport channel obtained in the downlink input from the data extraction unit 207, the scheduling unit 104 maps the resultant to a logical channel of the downlink, and outputs the resultant to the higher layer 208.

In addition, the scheduling unit 204 notifies the data control unit 207 of the downlink and uplink scheduling information including information for decoding processing of a physical downlink control channel (PDCCH). At this time, in the data control unit 207, in order to detect what RNTI (Radio Network Temporary Identity) scrambles the cyclic redundancy check (CRC) of downlink control information (DCI) carried by the physical downlink control channel (PDCCH), the scheduling unit 204 notifies the data control unit 207 of the downlink and uplink scheduling information including RNTI information to be detected.

The channel estimation unit 205 estimates a downlink channel state from a downlink reference signal (RS) for downlink data demodulation, and outputs the estimation result to the OFDM demodulation unit 206.

Moreover, the channel estimation unit 205 estimates a downlink channel state from a downlink reference signal (RS) in order to notify the base station apparatus 100 of the estimation result of the downlink channel state (radio channel state), converts this estimation result into a downlink channel feedback report (channel quality information and the like), and outputs the downlink channel feedback report to the scheduling unit 204. In addition, in order to notify the base station apparatus 100 of a downlink measurement result, a measurement result of the downlink reference signal (RS) is output to a radio resource control unit 209.

The OFDM demodulation unit 206 performs OFDM demodulation processing on modulation data input from the radio unit 203 based on the downlink channel state estimation result input from the channel estimation unit 205, and outputs the resultant to the data extraction unit 207.

The data extraction unit 207 performs cyclic redundancy check (CRC) on data input from the OFDM demodulation unit 206, checks accuracy, and in addition, outputs a check result (ACK/NACK feedback information) to the scheduling unit 204.

In addition, based on the scheduling information from the scheduling unit 204, the data extraction unit 207 separates a transport channel and control data of the physical layer from the data input from the OFDM demodulation unit 206, and outputs the resultant to the scheduling unit 204. The separated control data includes scheduling information such as downlink or uplink resource allocation or uplink HARQ control information. At this time, a search space (also referred to as a search region) of the physical downlink control channel (PDCCH) is decoded, and downlink or uplink resource allocation and the like for its own station are extracted.

The higher layer 208 performs processing of a packet data convergence protocol (PDCP) layer, a radio link control (RLC) layer, and a radio resource control (RRC) layer. The higher layer 208 has a radio resource control unit 209. Since the higher layer 208 controls processing units of the lower layers integrally, interfaces between: the higher layer 208; and the scheduling unit 204, the antenna unit A2, the data control unit 201, the DFT-S-OFDM modulation unit 202, the channel estimation unit 205, the OFDM demodulation unit 206, the data extraction unit 207, and the radio unit 203 are present. However, the interfaces are not shown.

The radio resource control unit 209 performs management of various types of setting information, management of system information, management of measurement setting and measurement result, paging control, management of a communication state of its own station, mobility management of a handover and the like, management of a buffer situation, management of connection setting of unicast and multicast bearers, and management of a mobile station identifier (UEID).

Figure 5:
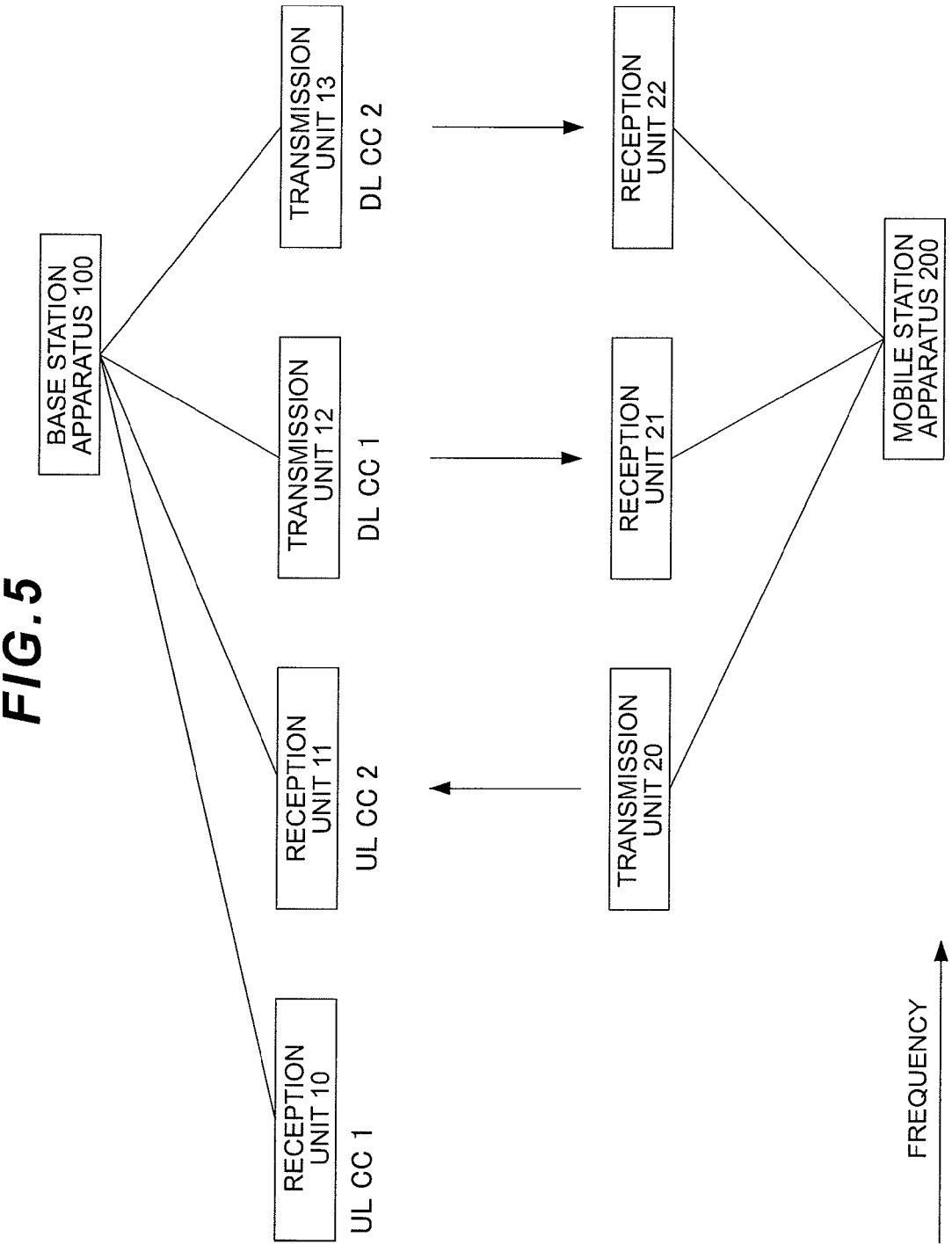
FIG. 5 is a view showing an example of a network configuration according to an embodiment of the present invention.

FIG. 5 is a view showing an example of a network configuration of the present invention. If the base station apparatus 100 is simultaneously communicable by a plurality of frequency layers (a downlink component carrier DL CC1 to a downlink component carrier DL CC2, and an uplink component carrier UL CC1 to an uplink component carrier UL CC2) by carrier aggregation, the base station apparatus 100 includes a transmission unit 12 and a transmission unit 13 (DL CC1 to DL CC2) for each of a plurality of downlink frequency layers. The base station apparatus 100 includes a reception unit 10 and a reception unit 11 (UL CC1 to UL CC2) for each of a plurality of uplink frequency layers. However, even if the DL CC1 or the UL CC1 is provided from another base station, there is no problem in realizing the present embodiment. Furthermore, the transmission unit 12 and the transmission unit 13 may be configured by one transmission unit. In addition, the reception unit 10 and the reception unit 11 may be configured by one transmission unit.

The mobile station apparatus 200 includes a reception unit 21 and a reception unit 22 for each of a plurality of downlink frequency layers. The mobile station apparatus 200 includes a transmission unit 20 for each of a plurality of uplink frequency layers. The reception unit 21 and the reception unit 22 may be configured by one reception unit. In addition, in this example, although the mobile station apparatus 200 includes one transmission unit 20, if uplink carrier aggregation is performed, there is a case where the mobile station apparatus 200 includes a plurality of transmission units. In this manner, the number of carriers that the base station apparatus 100 provides may be different from the number of carriers the mobile station apparatus 200 uses. Since the setting of component carriers (carrier aggregation) are performed on the mobile station apparatus 200 by a dedicated signal (RRC signaling, or the like), the setting of component carriers unique to the mobile station apparatus can be performed. In FIG. 5, the base station apparatus 100 includes the DL CC1, the DL CC2, the UL CC1, and the UL CC2, whereas the mobile station apparatus 200 is set so as to use the DL CC1, the DL CC2, and the UL CC2.

The mobile station apparatus 200, without particularly being conscious of what base station apparatus transmits a downlink component carrier or what base station apparatus receives an uplink component carrier, recognizes it as a cell. The mobile station apparatus 200 obtains system information broadcast in cells, and system information such as a frequency band and bandwidth of a corresponding downlink or uplink component carrier from a dedicated signal (RRC signaling, or the like) of which each individual mobile station apparatus is notified.

Downlink control information carried by a physical downlink control channel (PDCCH) is referred to as DCI (Downlink Control Information). A plurality of formats is prepared for DCI. The format of DCI is referred to as a DCI Format. A plurality of DCI Formats is present, and DCI Formats are classified by the use, the number of bits, or the like. There are DCI Formats having the same number of bits or the different number of bits. The mobile station apparatus performs reception of a physical downlink shared channel (PDSCH) in accordance with a DCI Format received. The mobile station apparatus can determine the use of a PDCCH and/or a PDSCH (a transport channel or a logical channel), a DCI format, or a transmission scheme of the PDSCH due to by what identifier (RNTI) the cyclic redundancy check (CRC) of DCI is scrambled. An RNTI (Radio Network Temporary Identity) is implicitly coded by the CRC of DCI included in a physical downlink control channel (PDCCH). Specifically, by computing the logical sum of CRC parity bits of 16 bits and an RNTI, a CRC is scrambled by the RNTI.

A physical downlink control channel (PDCCH) is configured by one control channel element or a set of a plurality of control channel elements (CCEs), a plurality of corresponding sets of CCEs is present, a plurality of numbers of CCEs included in the physical downlink control channel (PDCCH) is also present, and the coding rate is variable. The number of bits of a physical downlink control channel (PDCCH) is determined by the numbers of CCEs included in the physical downlink control channel (PDCCH), and the coding rate is determined by the number of bits of the DCI carried by the physical downlink control channel (PDCCH). One control channel element (CCE) is configured by an aggregation of a plurality of resource element groups. The mobile station apparatus decodes all candidates in which physical downlink control channel (PDCCHs) are arranged; and the mobile station apparatus specifies and decodes a physical downlink control channel (PDCCH) to be obtained, in the case of including an RNTI to be detected and succeeding in a CRC. This processing is referred to as blind decoding. In order to reduce the number of times of this blind decoding, the search space (groups of resource elements to be decoded) of a physical downlink control signal (PDCCH) is limited by an output of a hash function based on a cell-radio network temporary identity (C-RNTI) that is a mobile station identity. This space determined for each mobile station apparatus is referred to as an UE-specific search space. In contrast, a common search space is a search space in which all mobile station apparatuses in a cell search commonly the physical downlink control channel (PDCCH), separately from the UE-specific search space. That is, the common search space is a search space commonly determined for the mobile station apparatuses in a cell.

Figure 6:
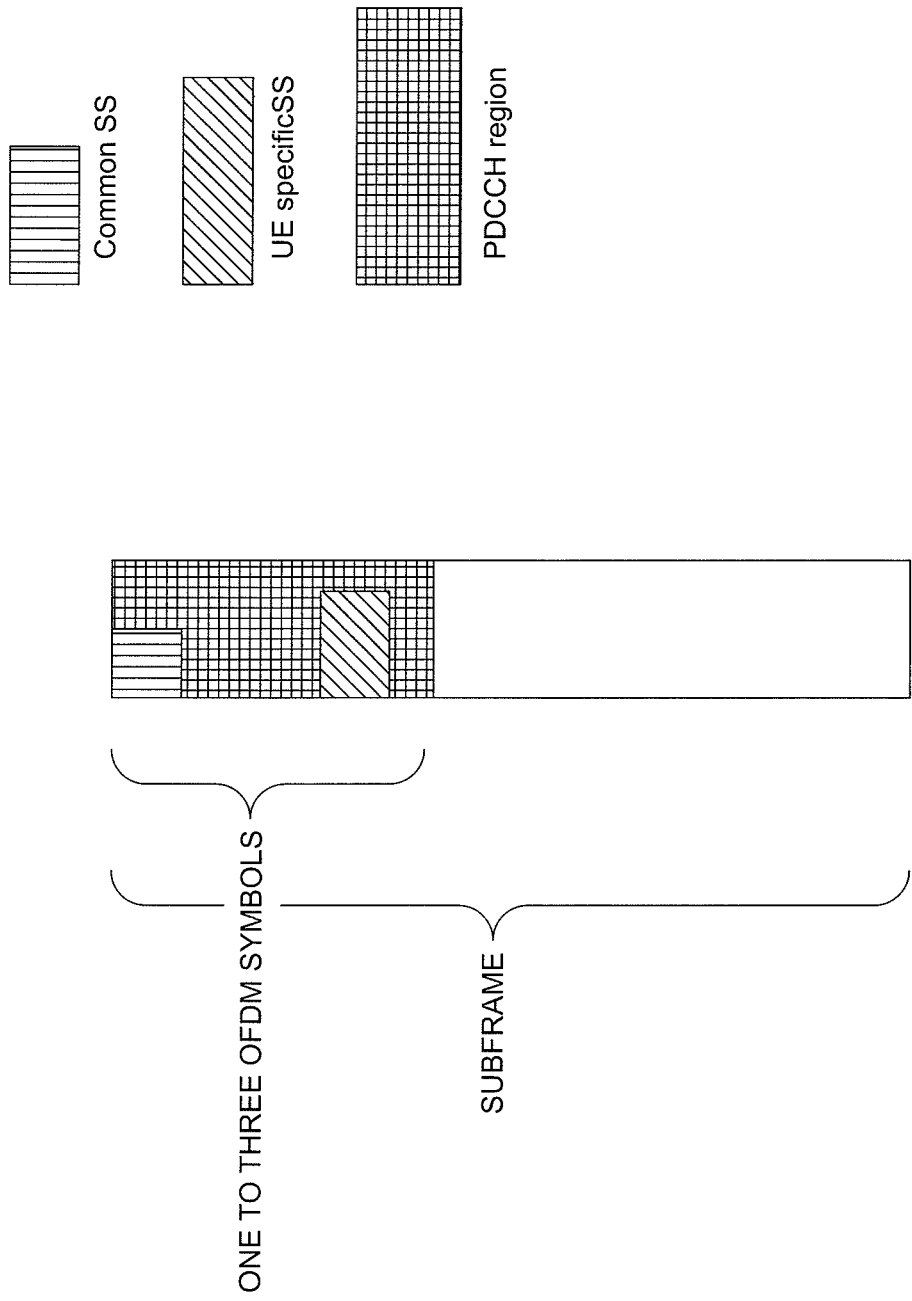
FIG. 6 is a conceptual diagram of a search space according to an embodiment of the present invention.

FIG. 6 is a conceptual diagram of a search space. OFDM symbols in which a physical downlink control channel (PDCCH) can be arranged are one to three symbols from the head of a subframe, and the number of OFDM symbols in which a physical downlink control channel (PDCCH) can be arranged is variable. A physical downlink control channel (PDCCH) is arranged in the resource elements excluding a reference signal, physical hybrid ARQ indicator channel (PHICH), physical control format indicator channel (PCFICH) within these one to three symbols from the head of the subframe. A set of CCEs within these one to three symbols from the head of the subframe is an UE-specific search space or a common search space.

The number of blind decoding candidates is determined by the size of the search space and the number of DCI Format sizes (the number of bits of DCI Formats or payload sizes) to be detected. In the common search space, there are six candidates as search spaces and two candidates as format sizes, and the number of blind decoding candidates is twelve. In the UE-specific search space, there are sixteen candidates as search spaces and two as format sizes, and the number of blind decoding candidates is thirty two. Accordingly, the number of blind decoding candidates in a certain subframe, of a certain mobile station apparatus is forty four. Meanwhile, when a different RNTI is used in the case of the same DCI Format, the number of times of blind decoding is not increased. In addition, when the same number of bits is used also in the case of different DCI Formats, the number of times of blind decoding is not increased. DCI Formats monitored in the common search space are DCI Format 1A, DCI Format 0, DCI Format 1C, DCI Format 3, and DCI Format 3A. DCI Format 1A, DCI Format 0, DCI Format 3, and DCI Format 3A have the same number of bits. DCI Formats monitored in the UE-specific search space are DCI Format 1A, DCI Format 0, and DCI Formats (1, 1B, 1D, 2, and 2A); and DCI Format 1A, and DCI Format 0 have the same number of bits. A mobile station apparatus is set by a base station apparatus so as to monitor any one of DCI Format 1, DCI Format 1B, DCI Format 1D, DCI Format 2, and DCI Format 2A. DCI formats (0 and 1A) are different from DCI formats (1, 1B, 1D, 2, and 2A) in the number of bits. A mobile station apparatus identifies whether the DCI Format is DCI format 0 or DCI format 1 from the flags included in DCI format 0 and DCI format 1.

A plurality of RNTIs is defined. A P-RNTI (Paging-RNTI) is used for scheduling of the update information of paging information and system information. An SI-RNTI (System Information-RNTI) is used for scheduling of system information. An RA-RNTI (Random Access-RNTI) is used for scheduling of random access response. A Temporary C-RNTI is used for downlink scheduling and uplink scheduling during random access response. A C-RNTI is used for dynamic scheduling of unicast downlink and uplink transmission. An SPS C-RNTI (Semi-persistent Scheduling C-RNTI) is used for semi-static scheduling of unicast downlink and uplink transmission. A TPC-PUCCH-RNTI (Transmit Power Control-Physical Uplink Control Channel-RNTI) or a TPC-PUSCH-RNTI (Transmit Power Control-Physical Uplink Shared Channel-RNTI) is used for uplink electric-power control of a physical layer.

Specific description of downlink-related PDCCH decoding processing will be given. A mobile station apparatus set so as to decode a PDCCH having a CRC scrambled by an SI-RNTI, a P-RNTI or an RA-RNTI decodes DCI Format 1A, or DCI Format 1C in the common search space. A mobile station apparatus set so as to decode a PDCCH having a CRC scrambled by a C-RNTI, or an SPS C-RNTI decodes: DCI Format 1A in the common search space; or DCI Format 1A or DCI Formats (1, 1B, 1D, 2, and 2A) in the UE-specific search space. A mobile station apparatus set so as to decode a PDCCH having a CRC scrambled by a Temporary C-RNTI decodes: DCI Format 1A in the common search space; or DCI Format 1A or DCI Format 1 in the UE-specific search space.

Specific description of uplink-related PDCCH decoding processing will be given. A mobile station apparatus set so as to decode a PDCCH having a CRC scrambled by a C-RNTI, or an SPS C-RNTI decodes: DCI Format 0 in the common search space; or DCI Format 0 in the UE-specific search space. A mobile station apparatus set so as to decode a PDCCH having a CRC scrambled by a C-RNTI, and set so as to receive a PDCCH Ordered RACH for downlink data arrival decodes: DCI Format 1A in the common search space; or DCI Format 1A in the UE-specific search space. A mobile station apparatus set so as to decode a PDCCH having a CRC scrambled by a Temporary C-RNTI decodes DCI Format 0 in the common search space. A mobile station apparatus set so as to decode a PDCCH having a CRC scrambled by a TPC-PUCCH-RNTI, or a TPC-PUSCH-RNTI decodes DCI Formats (3A and 3) in the common search space. DCI Format 3A and DCI Format 3 can arrange TPC Commands of a plurality of mobile station apparatuses in the DCI field. Therefore, DCI Format 3A and DCI Format 3 are arranged in the common search space so that the plurality of mobile station apparatuses can perform monitoring.

Subsequently, a method for extending a search space for a specific mobile station apparatus will be described. It is possible to mix and accommodate different release terminals such as LTE (Release 8 and Release 9) terminals, and an LTE-A (Release 10) terminal in a mobile communication system according to an embodiment of the present invention. In addition, the LTE-A terminal operates as the LTE (Release 8) terminal until the LTE-A terminal starts communication, and is indicated so as to perform the operation defined by a specific release from a base station apparatus.

DCI Formats that the LTE (Release 8) terminal monitors in the common search space are DCI Format 1A, DCI Format 0, DCI Format 1C, DCI Format 3, and DCI Format 3A. DCI Formats that the LTE (Release 8) terminal monitors in the UE-specific search space are DCI Format 1A, DCI Format 0, and DCI Formats (1, 1B, 1D, 2, and 2A).

DCI Formats that the LTE-A (Release 10) terminal monitors in the common search space are DCI Format 1A, DCI Format 0, DCI Format 1C, DCI Format 3, and DCI Format 3A. DCI Formats the LTE (Release 10) terminal monitors in the UE-specific search space are DCI Format 1A, DCI Format 0, DCI Format 0A, and DCI Formats (1, 1B, 1D, 2, 2A, and X). That is, by extension of a downlink transmission scheme, monitoring of DCI Format X is added. However, since 1, 1B, 1D, 2, 2A, and X are exclusively set, the introduction of DCI Format X does not increase the number of times of blind decoding. By extension of an uplink transmission scheme, monitoring of DCI Format 0A is added. Therefore, the number of blind decoding candidates is added with 16 to become 60. In addition, a carrier aggregation is set, and if the number of component carriers monitoring a PDCCH is defined as N, the number of blind decoding candidates is N×60. When carrier aggregation is not performed, N=1 may be used.

The mobile station apparatus: performs monitoring of a physical downlink control channel in a common search space commonly determined for the mobile station apparatuses in a cell, and an UE-specific search space determined for each mobile station apparatus in the cell; and performs monitoring of the physical downlink control channel also in an extension search space in accordance with an instruction from the base station apparatus. Therefore, it is possible to set an extension search space only a specific mobile station apparatus monitors, and it is possible to efficiently notify a specific plurality of mobile station apparatuses of system information, system information updating, paging information, random access response, information for uplink electric-power control of a physical layer, and the like.

Subsequently, with reference to FIGS. 7, 8, 9, 10, and 11, a method for monitoring a PDCCH by a mobile station apparatus when carrier aggregation is performed will be described. A downlink component carrier set is a set of component carriers used in a carrier aggregation set from a base station apparatus to the mobile station apparatus. CC#5 is an extension carrier, and a carrier that does not have a PDCCH region. In addition, a PDCCH monitoring set is a subset of the downlink component carrier set, and a set of downlink component carriers requested so that the mobile station apparatus monitors the PDCCH. The PDCCH monitoring set may be set from the base station apparatus to the mobile station apparatus or may be dynamically changed with the activation/deactivation of a component carrier, DRX (Discontinuous Reception) processing, or the like. The PDCCH monitoring set of the downlink component carrier set may serve as activated component carriers, and the component carriers other than the PDCCH monitoring set may serve as deactivated component carriers. The activation/deactivation of the PDCCH monitoring set and the component carriers may be independently controlled. If it is assumed that the activation and deactivation of the PDCCH monitoring set and the component carriers are independently controlled, the component carriers other than the PDCCH monitoring set, of the downlink component carrier set may be limited to activated component carriers, or may be directed to both of activated component carriers and deactivated component carriers. In addition, if the downlink component carrier set (excluding the extension carrier) is always the same as the PDCCH monitoring set, it is not necessary to set the PDCCH monitoring set.

The corresponding common search space, UE-specific search space, and PDCCH region (OFDM symbols in which the PDCCH can be arranged) of each component carrier is defined for each component carrier.

Figure 7:
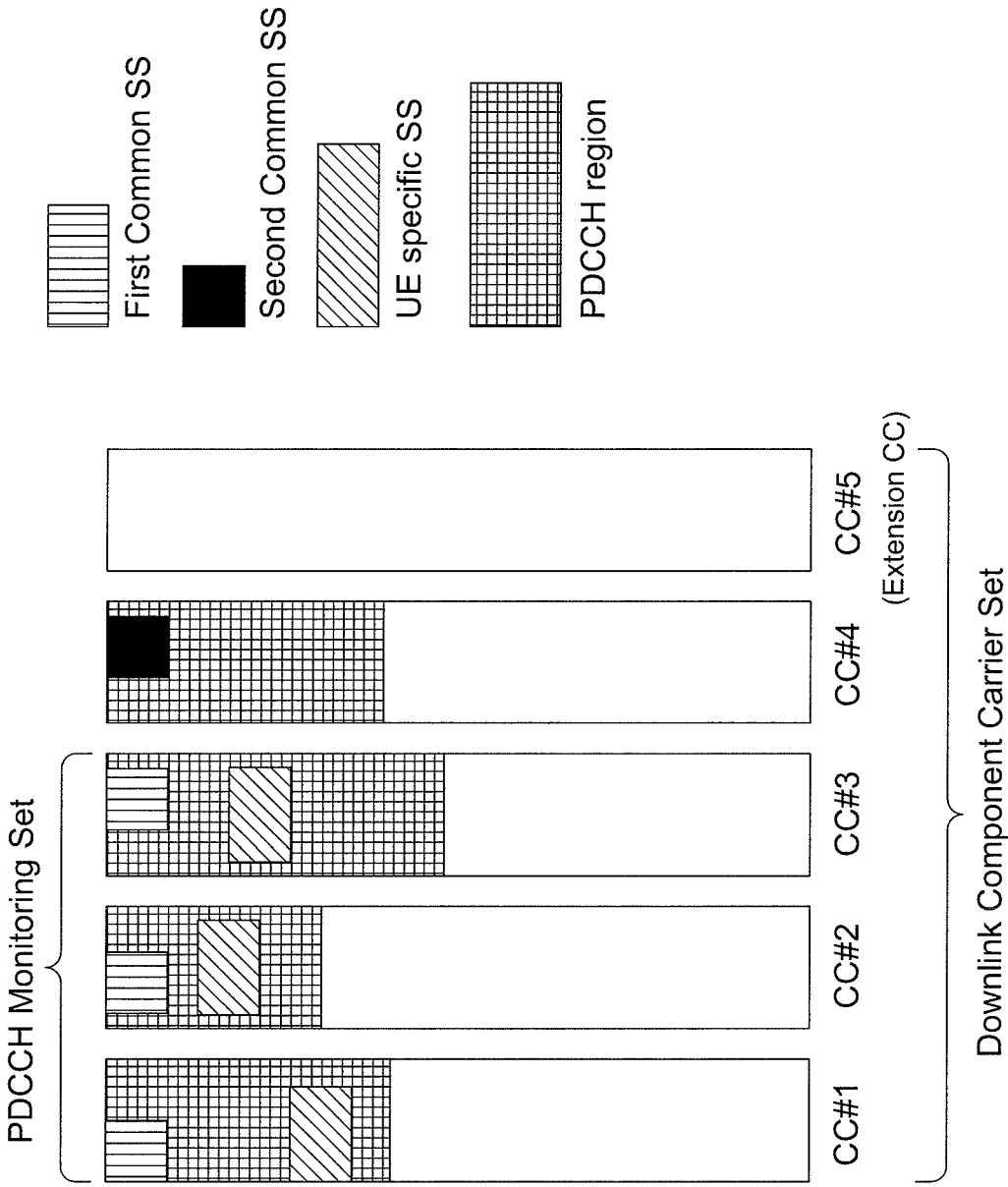
FIG. 7 is a view showing an example of an extension search space according to an embodiment of the present invention.

In FIG. 7, even if the PDCCH monitoring set is set, the mobile station apparatus monitors common search spaces of the downlink component carrier set (excluding the extension carrier). By doing so, it is possible to arrange, in each component carrier, paging information, system information updating, system information, random access response, and information for uplink electric-power control of a physical layer, and it is possible to avoid the concentration of PDCCH traffic in the common search space of one component carrier. That is, the mobile station apparatus: monitors (a first) common search space and an UE-specific search space in the PDCCH monitoring set; and monitors the common search space also in the component carrier other than the PDCCH monitoring set, in the component carriers in which a PDCCH can be arranged, in the downlink component carrier set. At this time, DCI Formats monitored in the common search space may be DCI Format 1A, DCI Format 0, DCI Format 1C, DCI Format 3, and DCI Format 3A; may be a DCI Format newly defined; and may be limited to DCI Formats of a part of them. At this time, RNTIs monitored in the UE-specific search space may be a P-RNTI, an SI-RNTI, an RA-RNTI, a Temporary C-RNTI, a C-RNTI, an SPS C-RNTI, a TPC-PUCCH-RNTI, and a TPC-PUSCH-RNTI; maybe an RNTI newly defined; and may be limited to RNTIs of a part of them. In this case, if the number of component carriers of the PDCCH monitoring set is set to N (N=3, in FIG. 7), and the number of component carriers in which (the first and/or a second) common search space is monitored is set to M (M=4, in FIG. 7), the number of blind decoding candidates becomes N×32+M×12.

Figure 8:
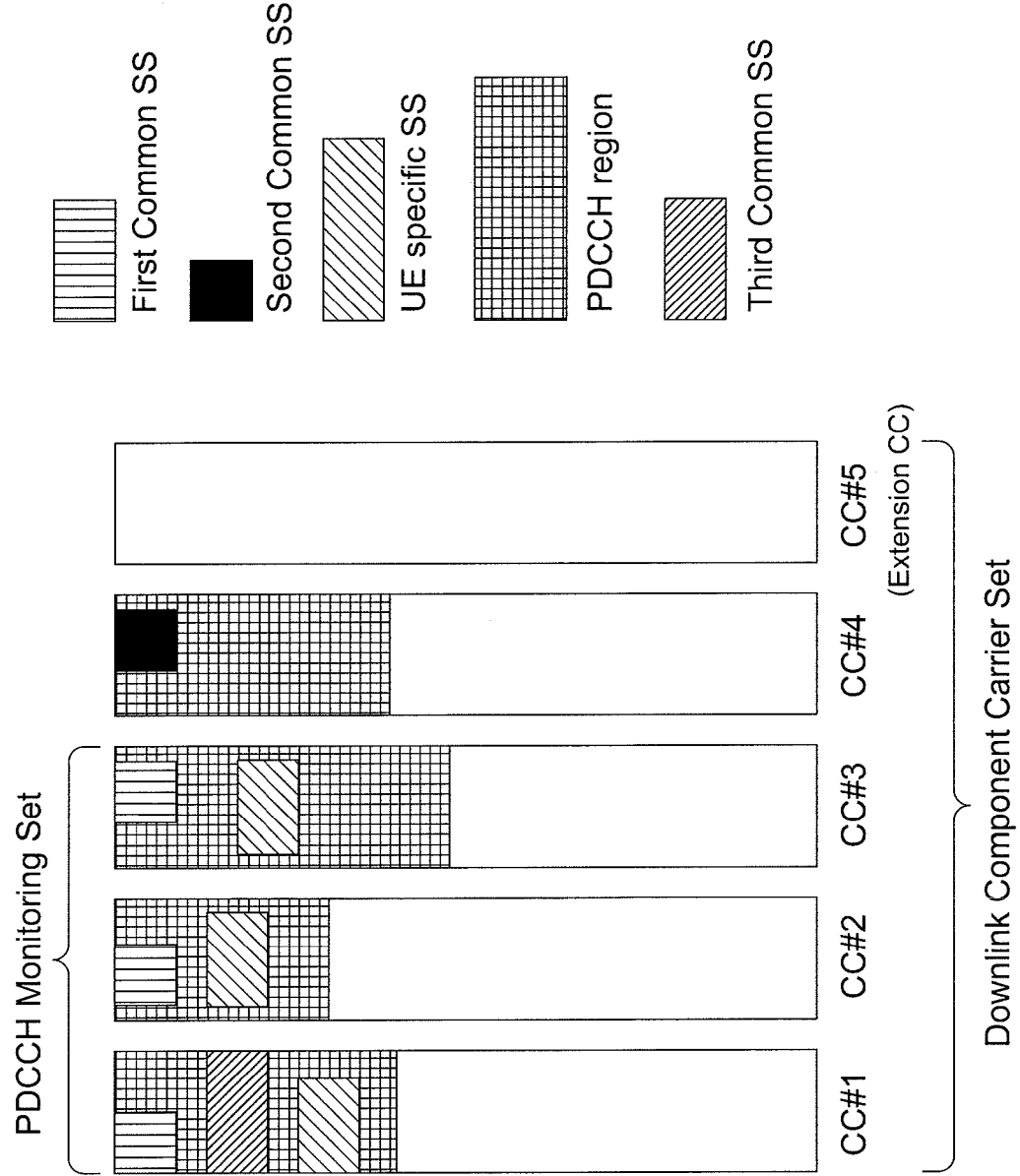
FIG. 8 is a view showing another example of an extension search space (a second common search space) according to an embodiment of the present invention.

In FIG. 8, in addition to that of FIG. 7, the mobile communication system further includes a third common search space. In the mobile station apparatus, a specific component carrier having the third common search space is explicitly specified, or implicitly specified in association with some other information; and the third common search space is monitored in the specific component carrier. The information for specifying the presence or absence of, the location of, or the space of the third common search space is specified from the base station apparatus to the mobile station apparatus by using system information broadcast in each of cells (component carriers) and a dedicated signal (RRC signaling, or the like) of which each individual mobile station apparatus is notified. Since it is impossible to perform such specifying of a space in LTE (Release 8), only a mobile station apparatus of new release such as LTE (Release 9), or LTE-A (Release 10) monitors the third common search space. By doing so, only a specific mobile station apparatus having the capability to monitor the third common search space can monitor the third common search space, and it is possible to notify the mobile station apparatus of system information, system information updating, paging information, random access response, information for uplink electric-power control of a physical layer, and the like for LTE-A. At this time, DCI Formats monitored in the third common search space may be DCI Format 1A, DCI Format 0, DCI Format 1C, DCI Format 3, and DCI Format 3A; may be a DCI Format newly defined; and may be limited to DCI Formats of a part of them. At this time, RNTIs monitored in the third common search space may be a P-RNTI, an SI-RNTI, an RA-RNTI, a Temporary C-RNTI, a C-RNTI, an SPS C-RNTI, a TPC-PUCCH-RNTI, and a TPC-PUSCH-RNTI; may be an RNTI newly defined; and may be limited to RNTIs of a part of them. In this case, if the number of component carriers of the PDCCH monitoring set is set to N (N=3, in FIG. 8), the number of component carriers in which (the first and/or the second) common search space is monitored is set to M (M=4, in FIG. 8), and the number of times of blind decoding of the third common search space is set to X, the number of blind decoding candidates becomes N×32 +M×12+X. When carrier aggregation is not performed, N=M=1 may be used. The third common search space may be arranged in only a specific component carrier, may be arranged in a plurality of component carriers, or may be arranged in all component carriers having a common search space.

Figure 9:
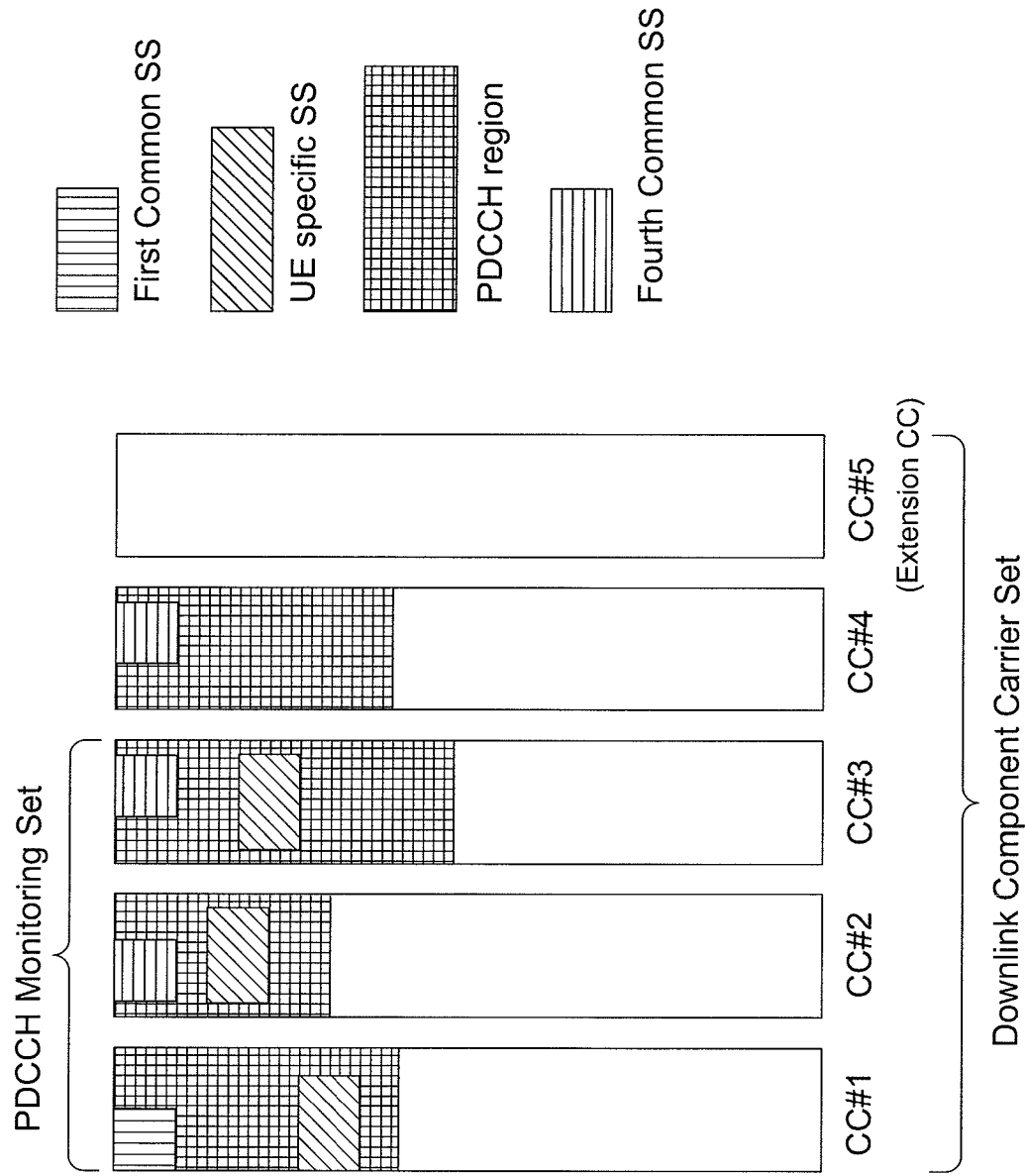
FIG. 9 is a view showing another example of an extension search space (a third common search space) according to an embodiment of the present invention.

In FIG. 9, a method for reducing the number of times of blind decoding is indicated. The mobile station apparatus: explicitly allocates one specific component carrier or a specific plurality of component carriers having (the first) common search space, or implicitly allocates the one specific component carrier or the specific plurality of component carriers in association with some other information; and monitors the common search space in the one specific component carrier or the specific plurality of component carriers (also referred to as anchor component carriers). The mobile station apparatus defines the common search spaces of component carriers other than it as fourth common search spaces, and does not monitor a plurality of fourth common search spaces in the same subframe in the fourth common search spaces. By doing so, in the fourth common search spaces, only when it becomes necessary to monitor the common search space, monitoring is performed; and furthermore, by prohibiting simultaneous monitoring of a plurality of fourth common search spaces, it becomes possible to reduce the number of times of blind decoding. This fourth common search space may be limited to the PDCCH monitoring set, and may be extended to the downlink component carrier set (excluding the extension carrier). In addition, the mobile station apparatus monitors also the UE-specific search space in the PDCCH monitoring set. In this case, if the number of component carriers of the PDCCH monitoring set is set to N (N=3, in FIG. 9), the number of component carriers in which (the first and/or the second) common search spaces are monitored is set to M (M=1, in FIG. 9), and the number of component carriers in which the fourth common search spaces are monitored is set to L (L=3, in FIG. 9), the number of blind decoding candidates becomes N×32+M×12+(12 or 0). Since the fourth common search space, if necessary, is monitored, there may be a case where the number of blind decoding candidates is 0. Although the number of blind decoding candidates of 12 is used for the fourth common search space, in a manner similar to the common search space, the number of blind decoding candidates may be a value other than 12.

Although the description has been given by the concept that the common search space is extended for a specific mobile station apparatus group, description will be given by the concept that a group-specific search space is newly provided for the specific mobile station apparatus group. In a manner similar to the third common search space, all LTE-A terminals may be grouped, or the mobile station apparatuses monitoring the same RNTI may be grouped. In a manner similar to the third common search space, when all LTE-A terminals may be grouped, the mobile station apparatus can specify the group-specific search space by a manner similar to a method for specifying the third common search space. Even when mobile station apparatuses monitoring the same RNTI are grouped, a manner similar to the method for specifying the third common search space may be used, or the mobile station apparatus may specify the group-specific search space by a hash function based on RNTIs, in a manner similar to the UE-specific search space. It is desirable to apply a method for determining the group-specific search space by the hash function based on RNTIs, particularly to a TPC-PUCCH-RNTI, or TPC-PUSCH-RNTI using DCI Format 3 and DCI Format 3A. In this case, it is possible to use the TPC-PUCCH-RNTI, or TPC-PUSCH-RNTI as an input of the hash function, as it is. However, the base station apparatus may notify newly the mobile station apparatus of an RNTI as an input of the hash function for determining the group-specific search space. Because of this, it is also possible to use broadcasting or a dedicated signal. In addition, this RNTI may be predefined. This group-specific search space may be arranged only in the PDCCH monitoring set, or may be arranged also in the component carriers other than the PDCCH monitoring set. At this time, DCI Formats monitored in the group-specific search space may be DCI Format 1A, DCI Format 0, DCI Format 1C, DCI Format 3, and DCI Format 3A; may be a DCI Format newly defined; and may be limited to DCI Formats of a part of them. At this time, RNTIs monitored in the group-specific search space may be a P-RNTI, an SI-RNTI, an RA-RNTI, a Temporary C-RNTI, a C-RNTI, an SPS C-RNTI, a TPC-PUCCH-RNTI, and a TPC-PUSCH-RNTI; may be an RNTI newly defined; and may be limited to RNTIs of a part of them.

Figure 10:
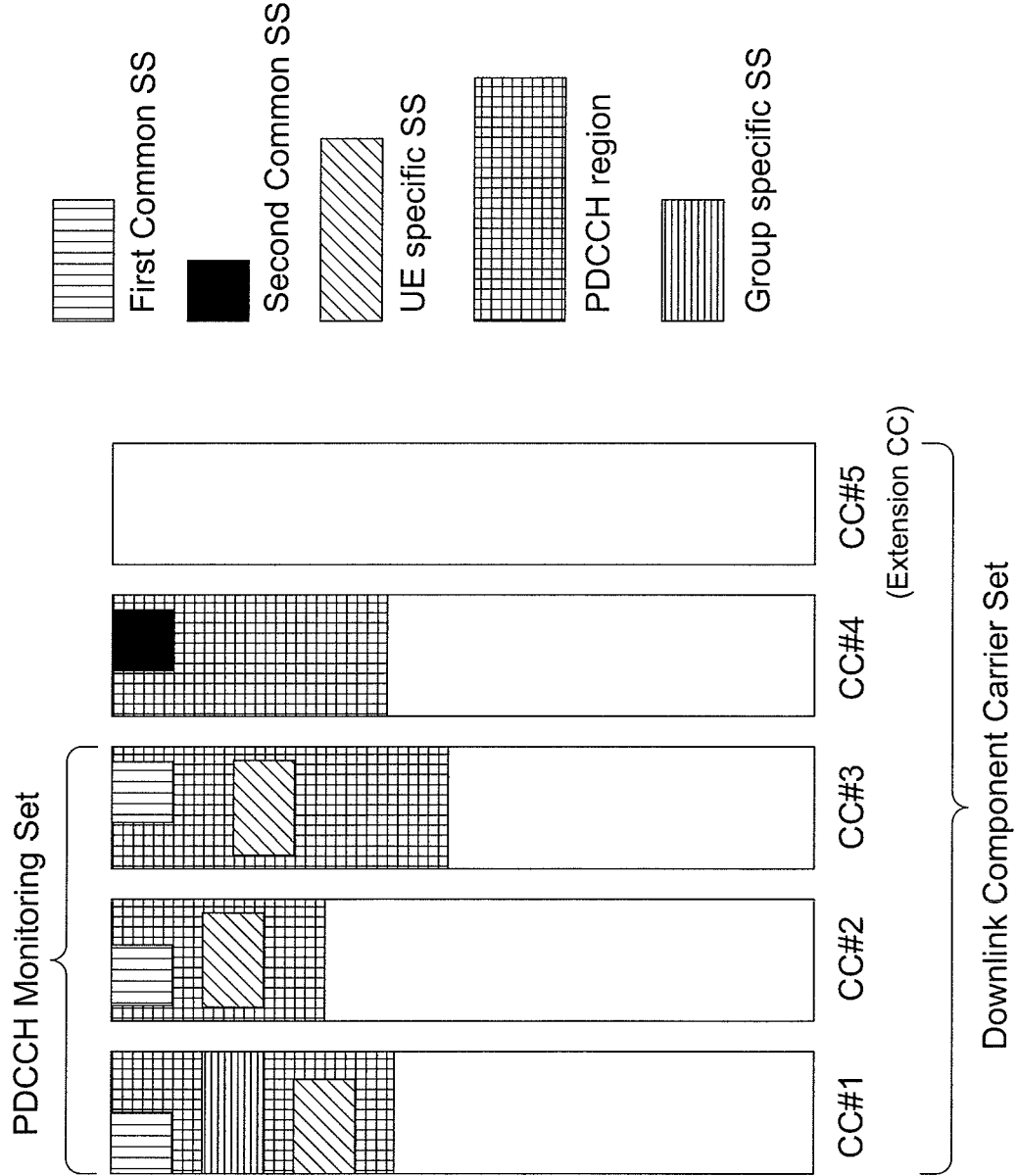
FIG. 10 is a view showing another example of an extension search space (a group-specific search space) according to an embodiment of the present invention.

In FIG. 10, a case where the group-specific search space is set is indicated. In this manner, by setting the group-specific search space, it is possible to set a space that only the mobile station apparatus monitors of a specific group monitor, and it is possible to efficiently notify the specific mobile station apparatus group of system information, system information updating, paging information, random access response, information for uplink electric-power control of a physical layer, and the like. In this case, if the number of component carriers of the PDCCH monitoring set is set to N (N=3, in FIG. 10), the number of component carriers in which (the first and/or the second) common search spaces are monitored is set to M (M=4, in FIG. 10), and the number of times of blind decoding of the group-specific search space is set to X, the number of blind decoding candidates becomes N×32+M×12+X.

Figure 11:
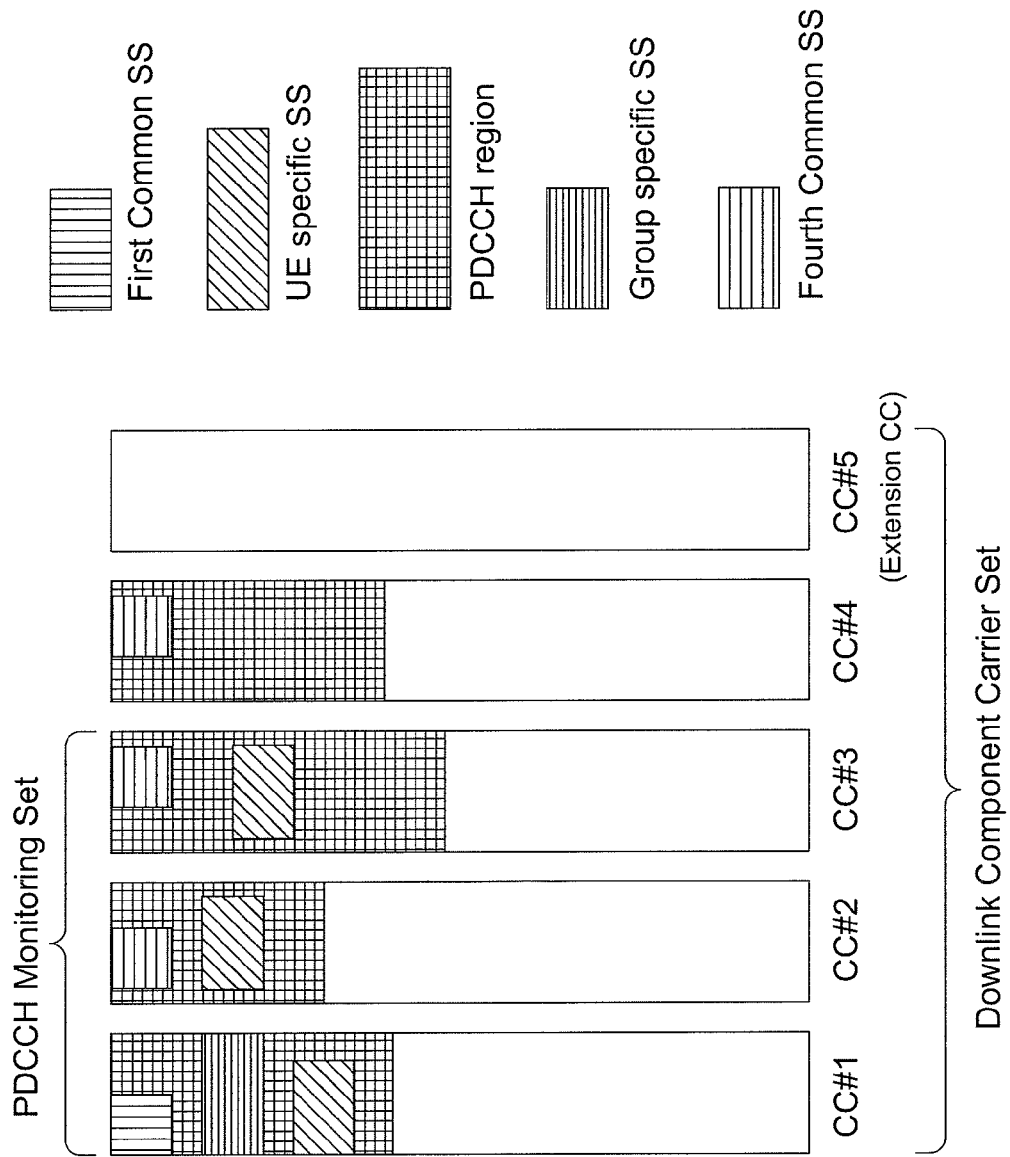
FIG. 11 is a view showing another example of an extension search space (the group-specific search space and the third common search space) according to an embodiment of the present invention.

In FIG. 11, a case where the group-specific search space and the fourth common search space are used is indicated. By doing so, while the number of times of blind decoding is reduced, it is possible to set a space that only the mobile station apparatus of a specific group monitors. In this case, if the number of component carriers of the PDCCH monitoring set is set to N (N=3, in FIG. 11), the number of component carriers in which (the first and/or the second) common search spaces are monitored is set to M (M=1, in FIG. 11), the number of component carriers in which the fourth common search spaces are monitored is set to L (L=3, in FIG. 11), and the number of times of blind decoding of the group-specific search space is X, the number of blind decoding candidates becomes N×32+M×12+X+(12 or 0).

Figure 12:
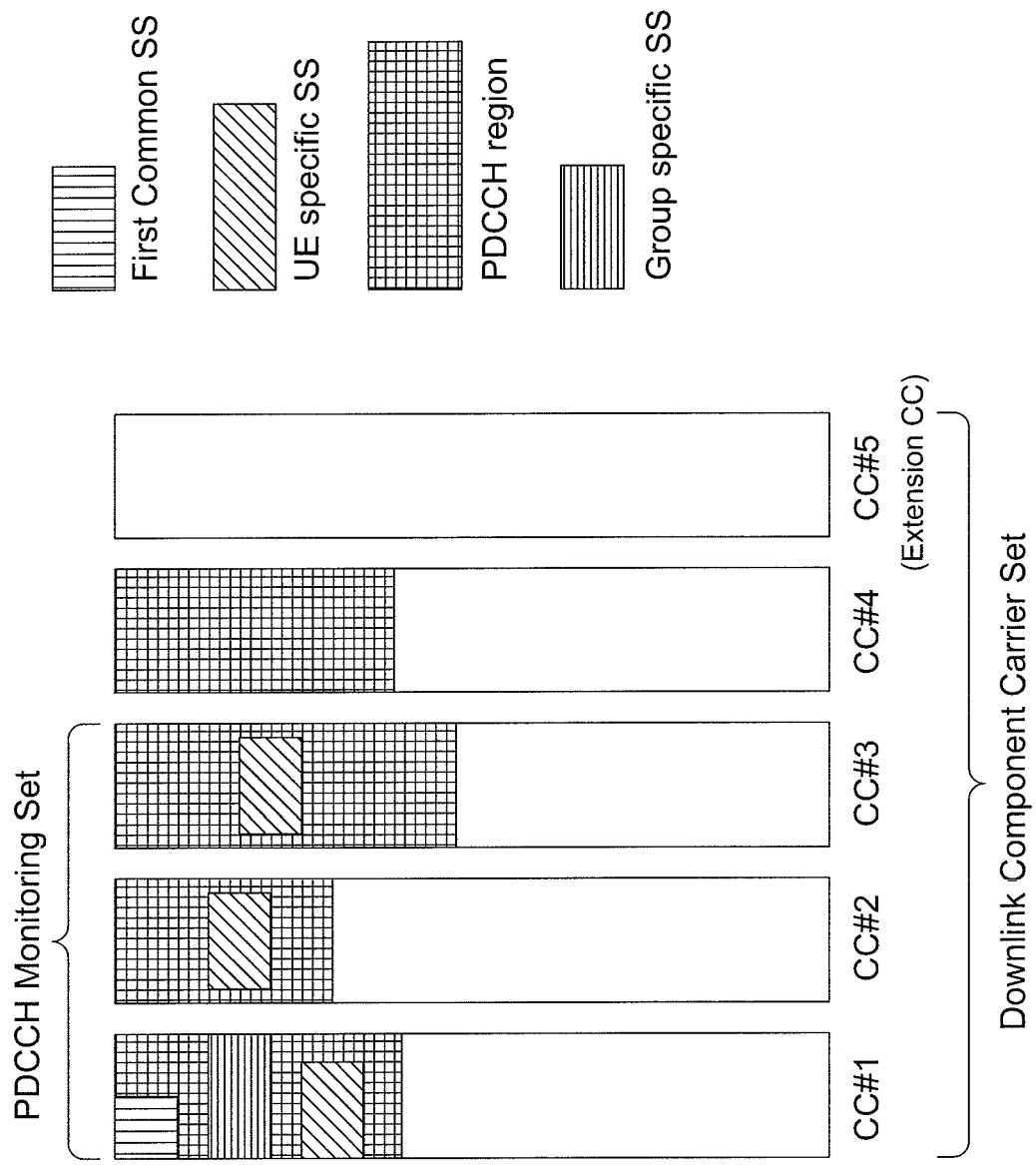
FIG. 12 is a view showing another example of an extension search space (the group-specific search space and an anchor carrier) according to an embodiment of the present invention.

In FIG. 12, a case where the group-specific search space and an anchor component carrier are used is indicated. By doing so, while the number of times of blind decoding is reduced, it is possible to set an space only the mobile station apparatus of a specific group monitors. In this case, if the number of component carriers of the PDCCH monitoring set is set to N (N=3, in FIG. 12), the number of component carriers in which (the first and/or the second) common search spaces are monitored is set to M (M=1, in FIG. 12), and the number of times of blind decoding of the group-specific search space is set to X, the number of blind decoding candidates becomes N×32+M×12+X.

Figure 13:
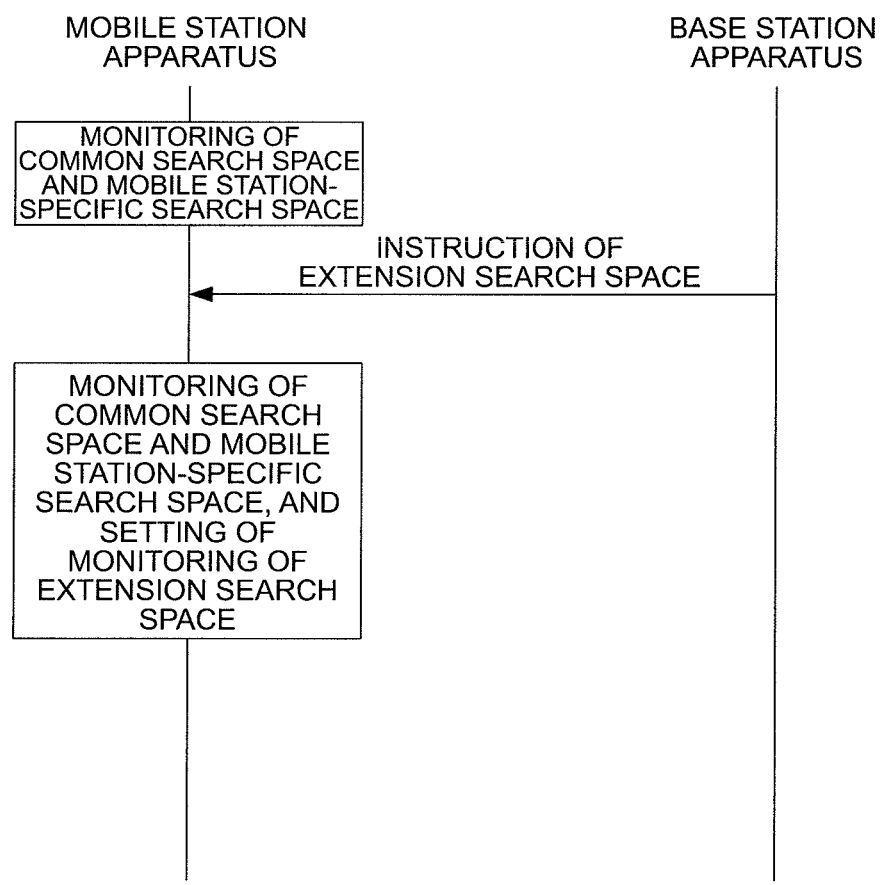
FIG. 13 is a view showing a monitoring start processing of an extension search space according to an embodiment of the present invention.

With reference to FIG. 13, a monitoring start processing of an extension search space such as the group-specific search space and/or the second common search space and/or the third common search space and/or the fourth common search space, and the like will be described. The base station apparatus notifies the mobile station apparatus of information related to an instruction to request the mobile station apparatus to monitor an extension search space. As described above, by using system information broadcast in cells (component carriers), and dedicated signals (RRC signaling, or the like) of which individual mobile station apparatuses are notified, the mobile station apparatuses are notified of the information related to the extension search space. However, it is desirable that the mobile station apparatuses are individually notified of the information related to the instruction to request the mobile station apparatus to monitor the extension search space by using the dedicated signals (RRC signaling, or the like). The mobile station apparatus that obtains the information related to the instruction to request the mobile station apparatus to monitor the extension search space is set so as to monitor the extension search space. The information related to the instruction to request the mobile station apparatus to monitor the extension search space may be explicitly specified, or may be implicitly specified in association with some other information.

As an example of a method for implicitly specifying the information related to the extension search space or the information related to the instruction to request the mobile station apparatus to monitor the extension search space, for example, the specifying maybe performed in conjunction with an instruction of a carrier aggregation; the specifying may be performed in conjunction with an instruction of a mode such as an LTE-A mode, or a Release 10 mode; the specifying may be performed in conjunction with an instruction of setting of the downlink component carrier set or setting of the PDCCH monitoring set; and the specifying may be performed in conjunction with activation and deactivation of component carriers.

In the above-described embodiments, a component carrier can also be simply interpreted as a cell, and the system information of a plurality of cells can also be interpreted as being managed by the mobile station apparatus.

In the above-described embodiments, although it has been described that one system is configured by a plurality of component carriers, a plurality of systems can also be interpreted as being aggregated to thereby be configured as one system. In addition, component carriers can also be interpreted as indicating a region in which the system is operated by the fact that specific receiver or transmitter adjusts a carrier frequency to center of each component carrier.

The above-described embodiments may be practiced in combination.

In the above-described embodiments, the base station apparatus and the mobile station apparatus may be one or more. In addition, the mobile station apparatus is not limited to a mobile terminal, and may be realized by implementing a function of the mobile station apparatus in the base station apparatus or a fixed terminal.

Furthermore, in the above-described embodiments, a program operating in the mobile station apparatus and the base station apparatus according to the present invention is a program controlling a CPU and the like (a program causing a computer to function) so as to realize the functions of the above-described embodiments according to the present invention. Then, the information handled in these apparatuses is temporarily stored in a RAM during the processing; thereafter is stored in various ROMs and HDDs; and, if necessary, is read out and corrected/written by a CPU. The recording medium that stores the program may be any of a semiconductor medium (for example, ROM, a nonvolatile memory card, or the like), an optical recording medium (for example, a DVD, MO, MD, CD, BD, or the like), a magnetic recording medium (for example, a magnetic tape, a flexible disk, or the like), or the like. In addition, the functions of the above-described embodiment is not only realized by executing a loaded program, but there is a case where the functions of the present invention is also realized by performing processing in conjunction with an operating system, another application program, or the like based on the program instruction.

In addition, when a product is distributed to the marketplace, the program can be stored in a portable recording medium to be distributed, or it can be transferred to a server computer connected via a network such as the Internet or the like. In this case, the storage apparatus of the server computer is also included in the present invention. In addition, apart or all of the mobile station apparatuses and the base station apparatuses in the above-described embodiments may be typically realized as an LSI that is an integrated circuit. Each functional block of the mobile station apparatuses and the base station apparatuses may be individually made into chips, or may be made into chips by integrating a part or all of them. Moreover, circuit integration techniques are not limited to LSIs, and may be realized by ASICs, chipset substrates, dedicated circuits, or general purpose processors. In addition, with the advent of circuit integration technologies substituted for LSIs by advances in semiconductor technologies, it also is possible to use an integrated circuit using the technologies.

Hereinabove, although embodiments of the present invention has been described in detail with reference to the drawings, specific configurations are not limited to this embodiments, and design and the like without departing from the scope of the present invention also are included in the claims.

DESCRIPTION OF THE REFERENCE NUMERALS 10, 11, 21, 22 reception unit
12, 13, 20 transmission unit
100 base station apparatus
101, 201 data control unit
102 OFDM modulation unit
103, 203 radio unit
104, 204 scheduling unit
105, 205 channel estimation unit
106 DFT-S-OFDM demodulation unit
107, 207 data extraction unit
108, 208 higher layer
200 mobile station apparatus
202 DFT-S-OFDM modulation unit
206 OFDM demodulation unit
A1, A2 antenna unit

The invention claimed is:

1. A mobile station apparatus that is configured to communicate with a base station apparatus, the mobile station apparatus comprising:
   a reception unit configured to perform detecting of Downlink Control Information with CRC (cyclic redundancy check) bits scrambled by C-RNTI (cell-radio network temporary identity) in a first search space which is commonly determined for mobile station apparatuses in a cell and a second search space which is a mobile station apparatus specific search space determined based on at least the C-RNTI; and
   the reception unit configured to perform detecting of the Downlink Control Information with the CRC bits scrambled by the C-RNTI in a third search space which is different from the first search space and the second search space, the third search space being configured by using at least a dedicated RRC (Radio Resource Control) signaling which includes at least information indicating a location of the third search space, wherein
   the first search space, the second search space and the third search space are configured in a same component carrier.

2. The mobile station apparatus to claim 1, wherein
   the reception unit configured to perform detecting of the Downlink Control Information with a same Downlink Control Information format in the first search space, the second search space and the third search space.

3. A base station apparatus that is configured to communicate with a mobile station apparatus that performs detecting of Downlink Control Information with CRC (cyclic redundancy check) bits scrambled by C-RNTI (cell-radio network temporary identity) in a first search space which is commonly determined for mobile station apparatuses in a cell and a second search space which is a mobile station apparatus specific search space determined based on at least the C-RNTI, the base station apparatus comprising:
   a scheduling unit configured to instruct the mobile station apparatus to perform detecting of the Downlink Control Information with the CRC bits scrambled by the C-RNTI in a third search space which is different from the first search space and the second search space, the third search space being configured by using at least a dedicated RRC (Radio Resource Control) signaling which includes at least information indicating a location of the third search space, wherein
   the first search space, the second search space and the third search space are configured in a same component carrier.

4. The base station apparatus to claim 3, wherein
   the Downlink Control Information with a same Downlink Control Information format is performed detecting by the mobile station apparatus in the first search space, the second search space and the third search space.

5. A radio communication method used in a mobile station apparatus that is configured to communicate with a base station apparatus, the radio communication method comprising:
   performing detecting of Downlink Control Information with CRC (cyclic redundancy check) bits scrambled by C-RNTI (cell-radio network temporary identity) in a first search space which is commonly determined for mobile station apparatuses in a cell and a second search space which is a mobile station apparatus specific search space determined based on at least the C-RNTI; and
   performing detecting of the Downlink Control Information with the CRC bits scrambled by the C-RNTI in a third search space which is different from the first search space and the second search space, the third search space being configured by using at least a dedicated RRC (Radio Resource Control) signaling which includes at least information indicating a location of the third search space, wherein
   the first search space, the second search space and the third search space are configured in a same component carrier.

6. The method to claim 5, wherein
   a Downlink Control Information Format for detecting of the Downlink Control Information by the mobile station apparatus is same in the first search space, the second search space and the third search space.

7. A radio communication method used in a base station apparatus that is configured to communicate with a mobile station apparatus that performs detecting of Downlink Control Information with CRC (cyclic redundancy check) bits scrambled by C-RNTI (cell-radio network temporary identity) in a first search space which is commonly determined for mobile station apparatuses in a cell and a second search space which is a mobile station apparatus specific search space determined based on at least the C-RNTI, the radio communication method comprising:
   instructing the mobile station apparatus to perform detecting of the Downlink Control Information with the CRC bits scrambled by the C-RNTI in a third search space which is different from the first search space and the second search space, the third search space being configured by using at least a dedicated RRC (Radio Resource Control) signaling which includes at least information indicating a location of the third search space, wherein
   the first search space, the second search space and the third search space are configured in a same component carrier.

8. The method to claim 7, wherein
a Downlink Control Information Format for detecting of the Downlink Control Information by the mobile station apparatus is same in the first search space, the second search space and the third search space.

* * * * *